Aug. 14, 1923.
1,464,957
O. A. SMITH
POINTING AND SHAVING MACHINE FOR BOLTS, ETC
Filed Aug. 10, 1921 14 Sheets-Sheet 7

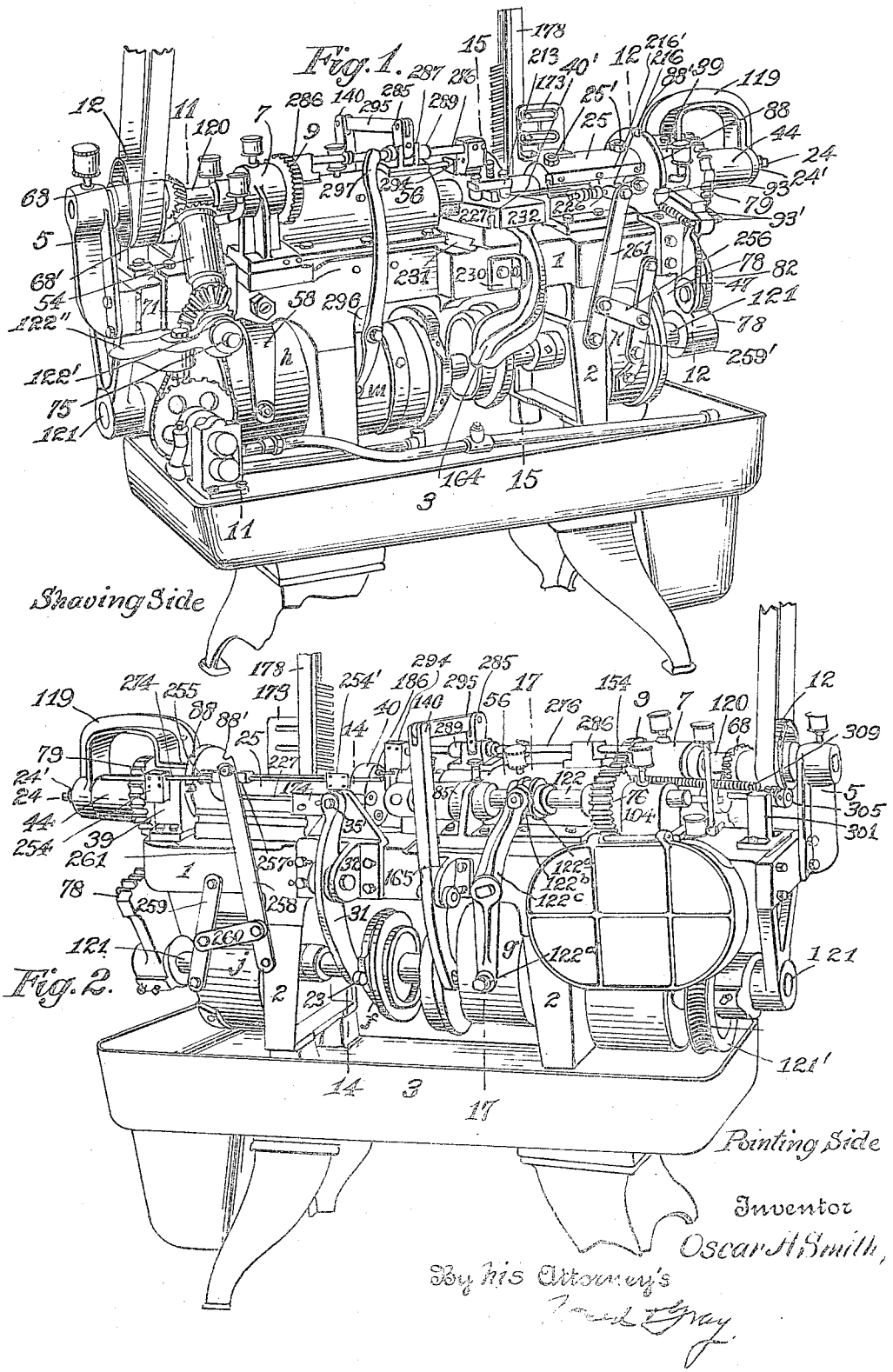

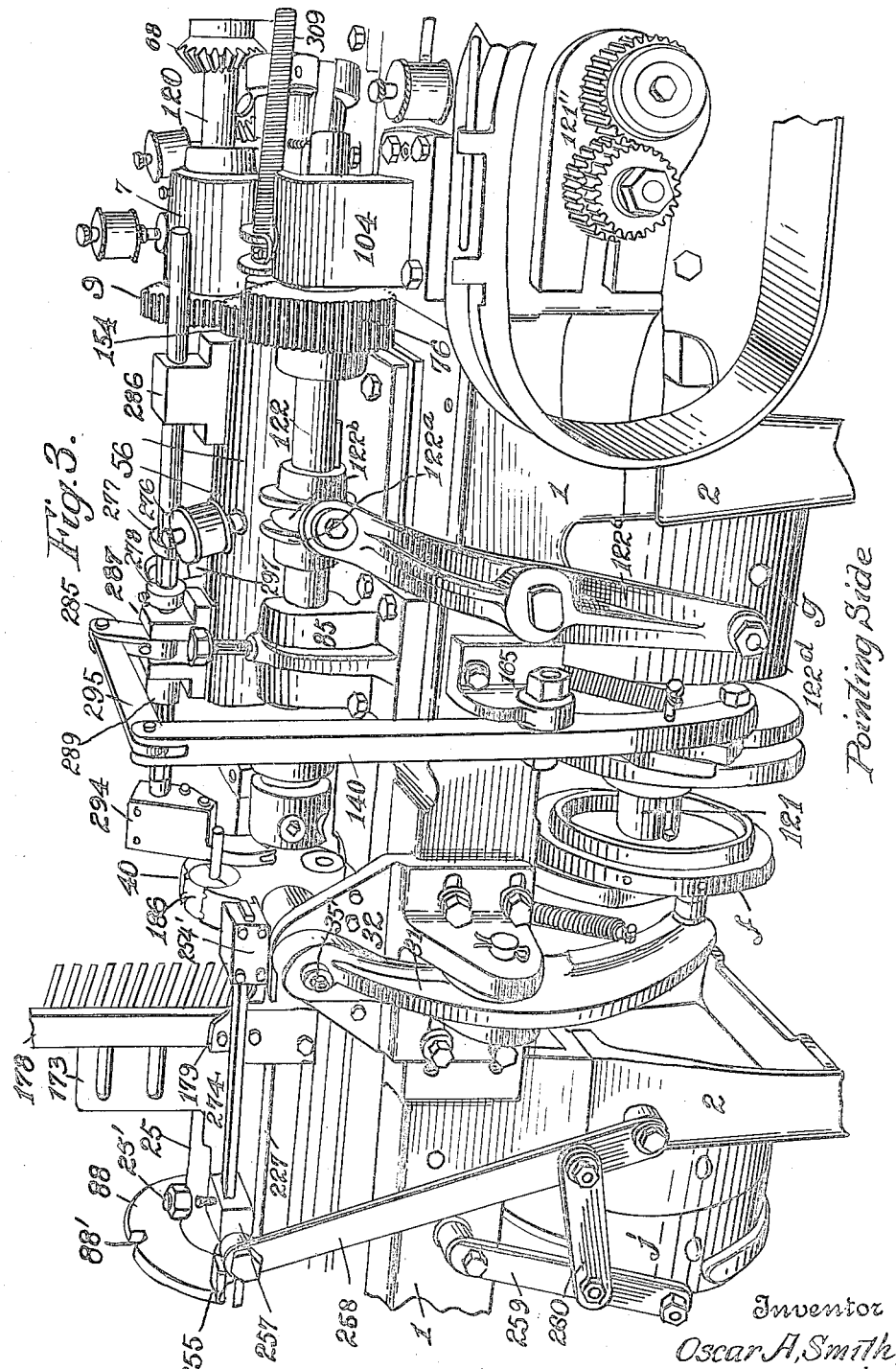

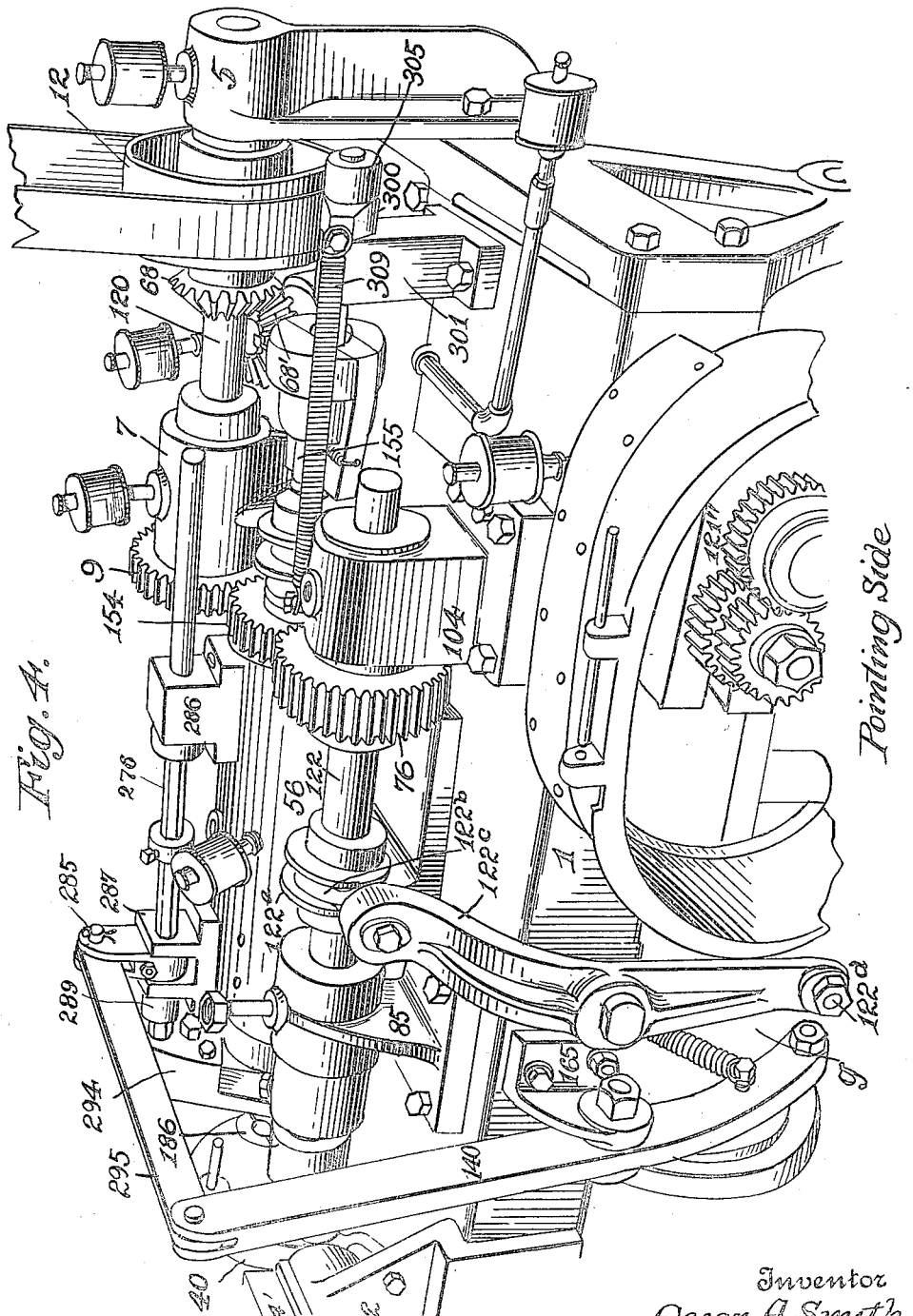

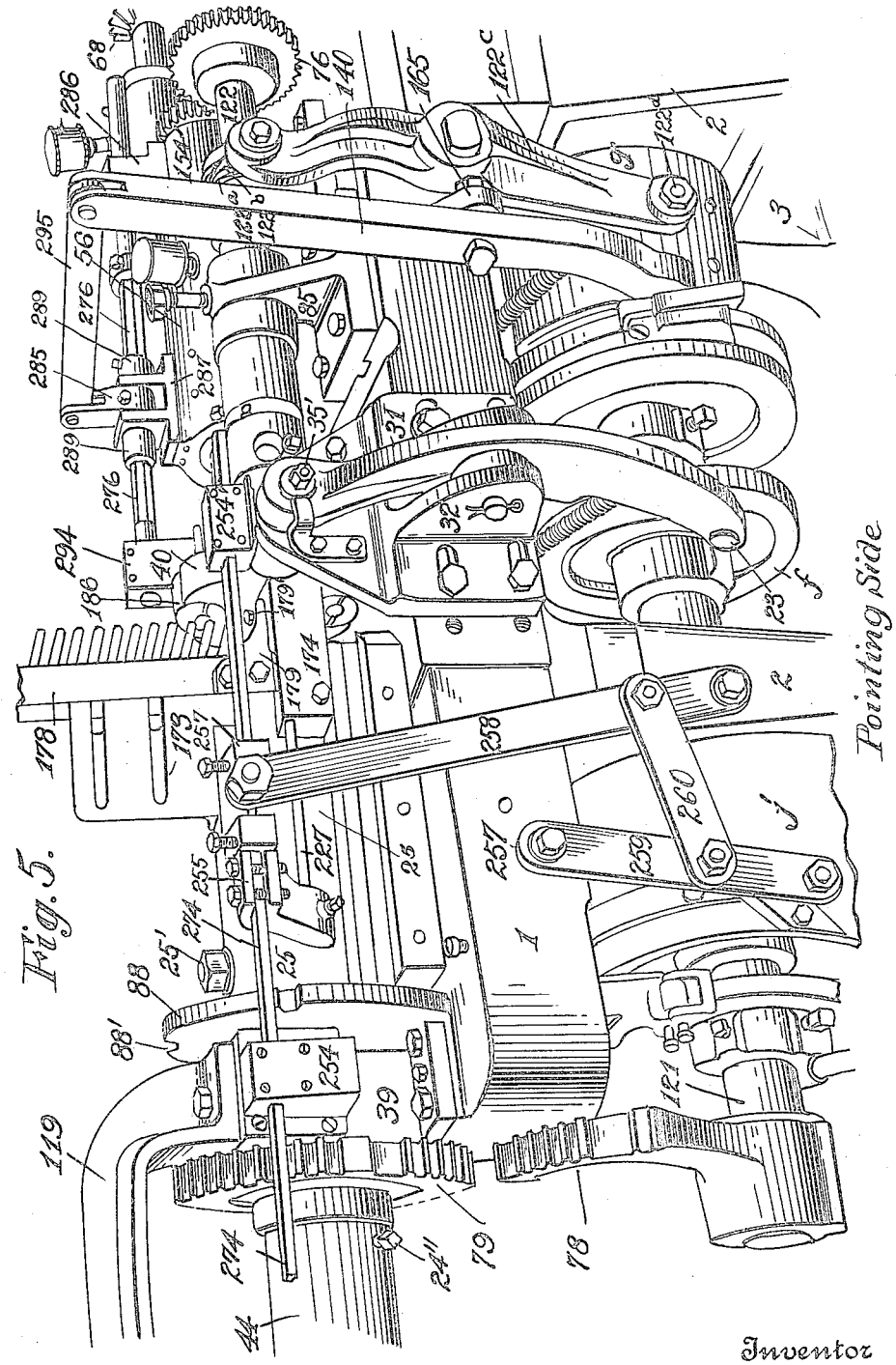

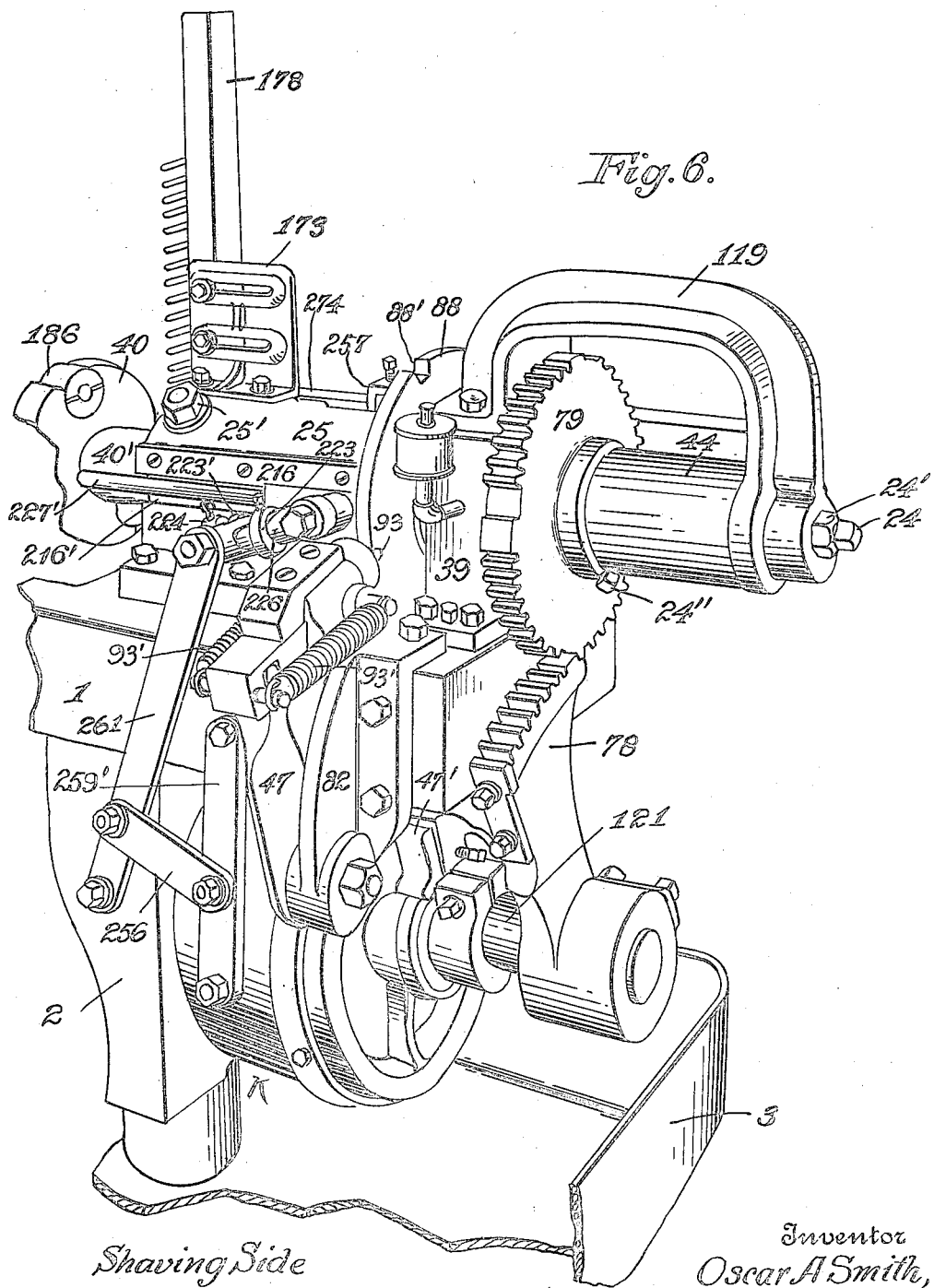

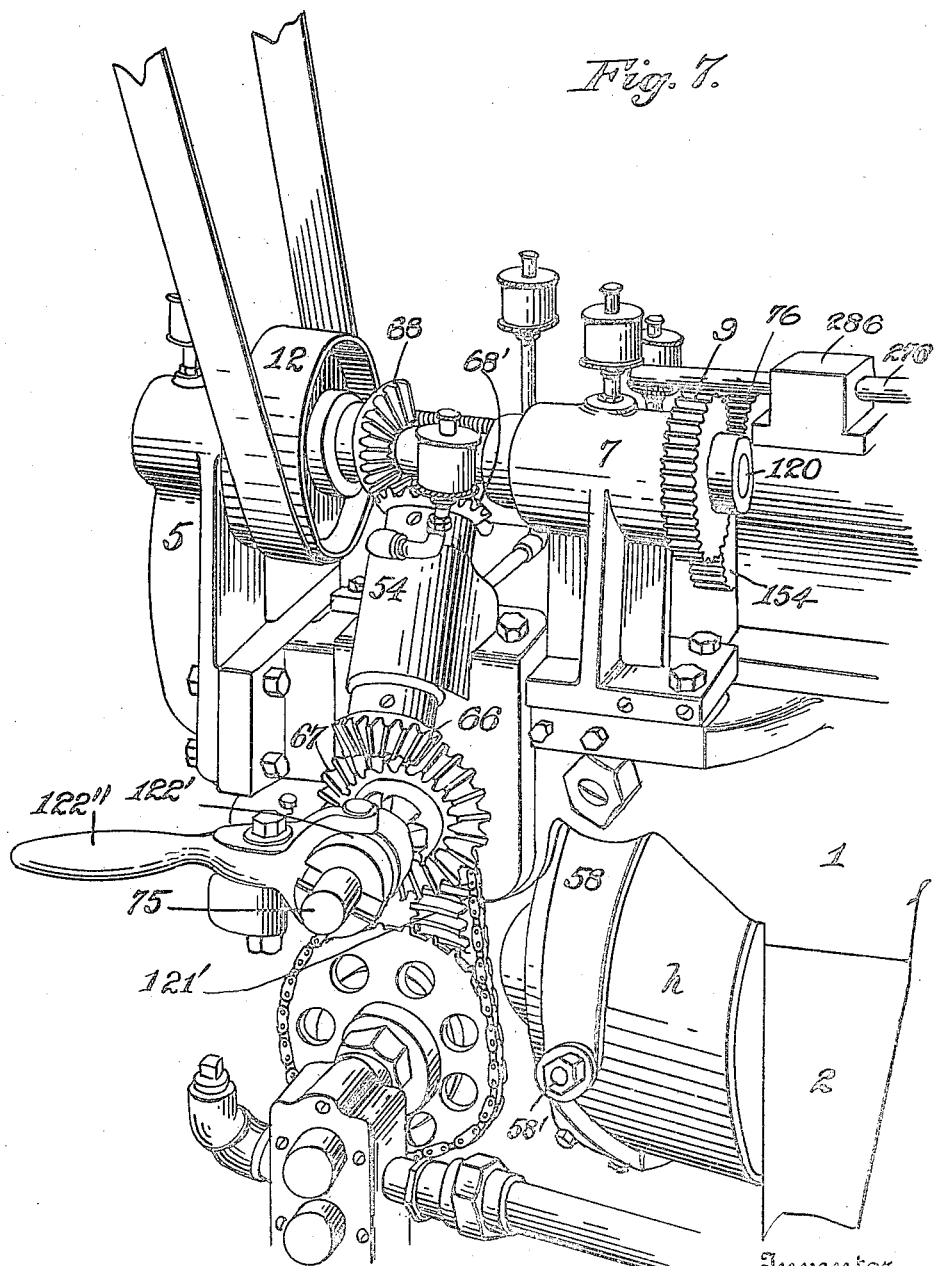

*Fig. 8.*

*Shaving Side*

Inventor
Oscar A. Smith,
By his Attorneys

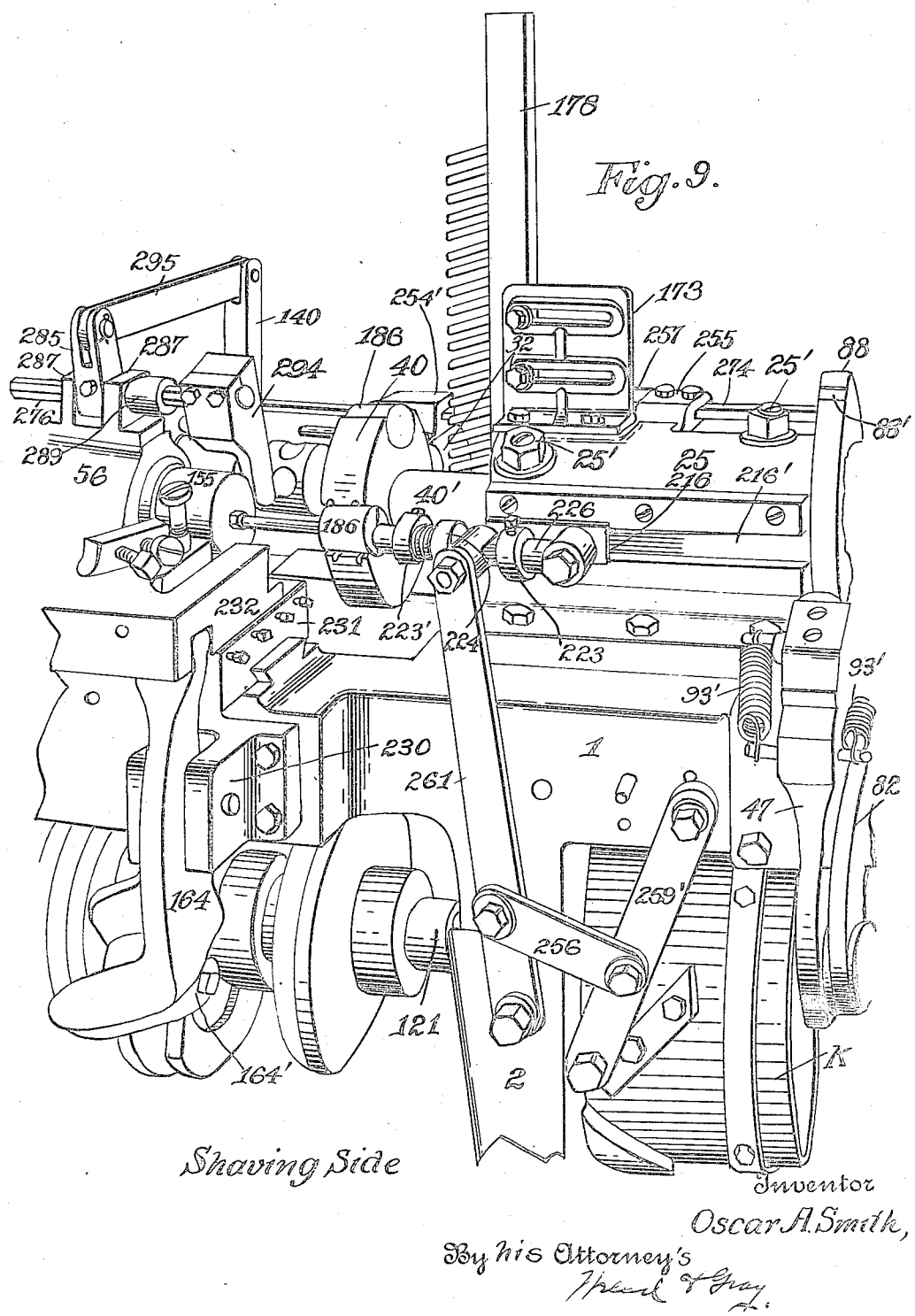

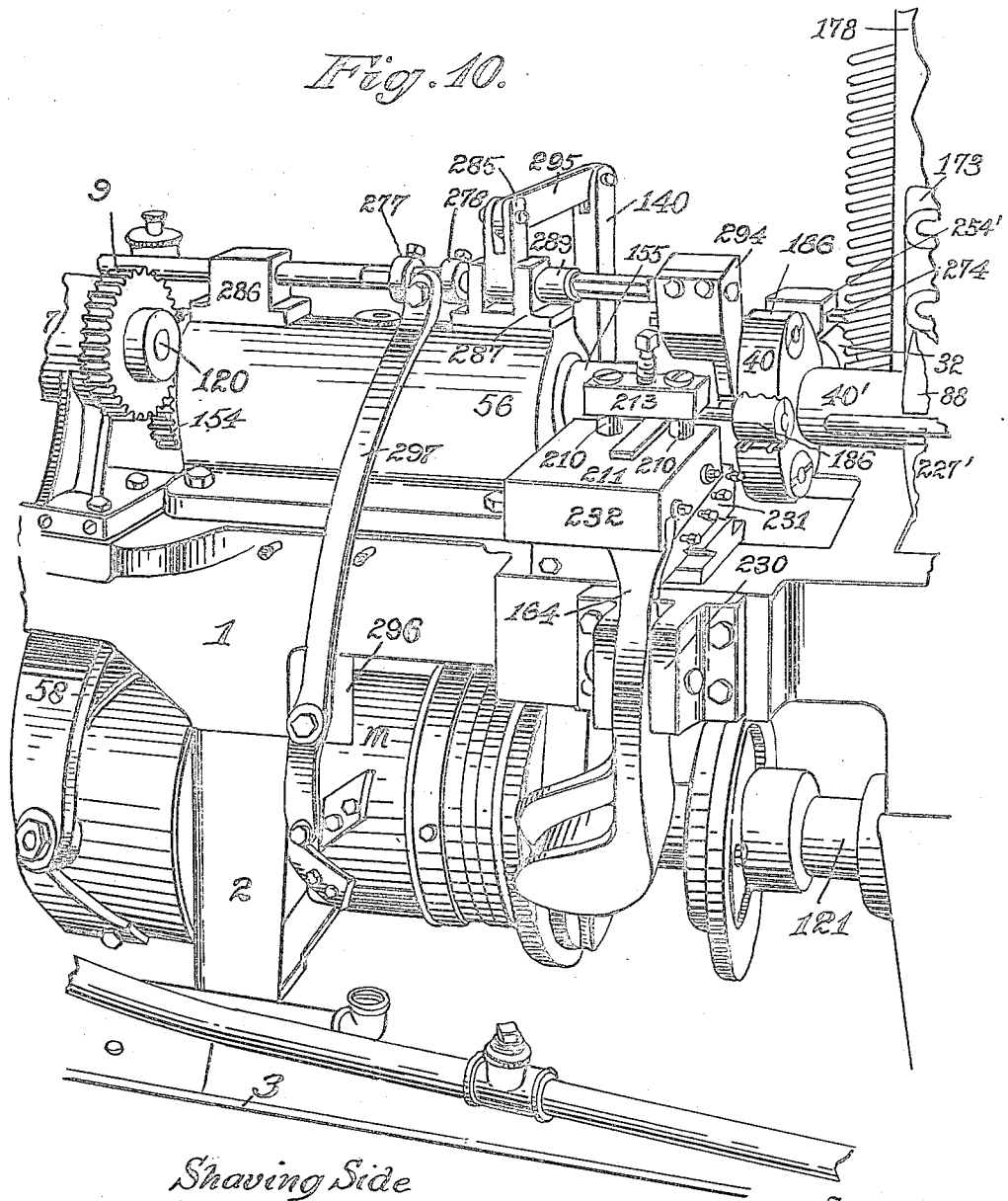

Aug. 14, 1923.
O. A. SMITH
POINTING AND SHAVING MACHINE FOR BOLTS, ETC
Filed Aug. 10, 1921    14 Sheets-Sheet 10
1,464,957
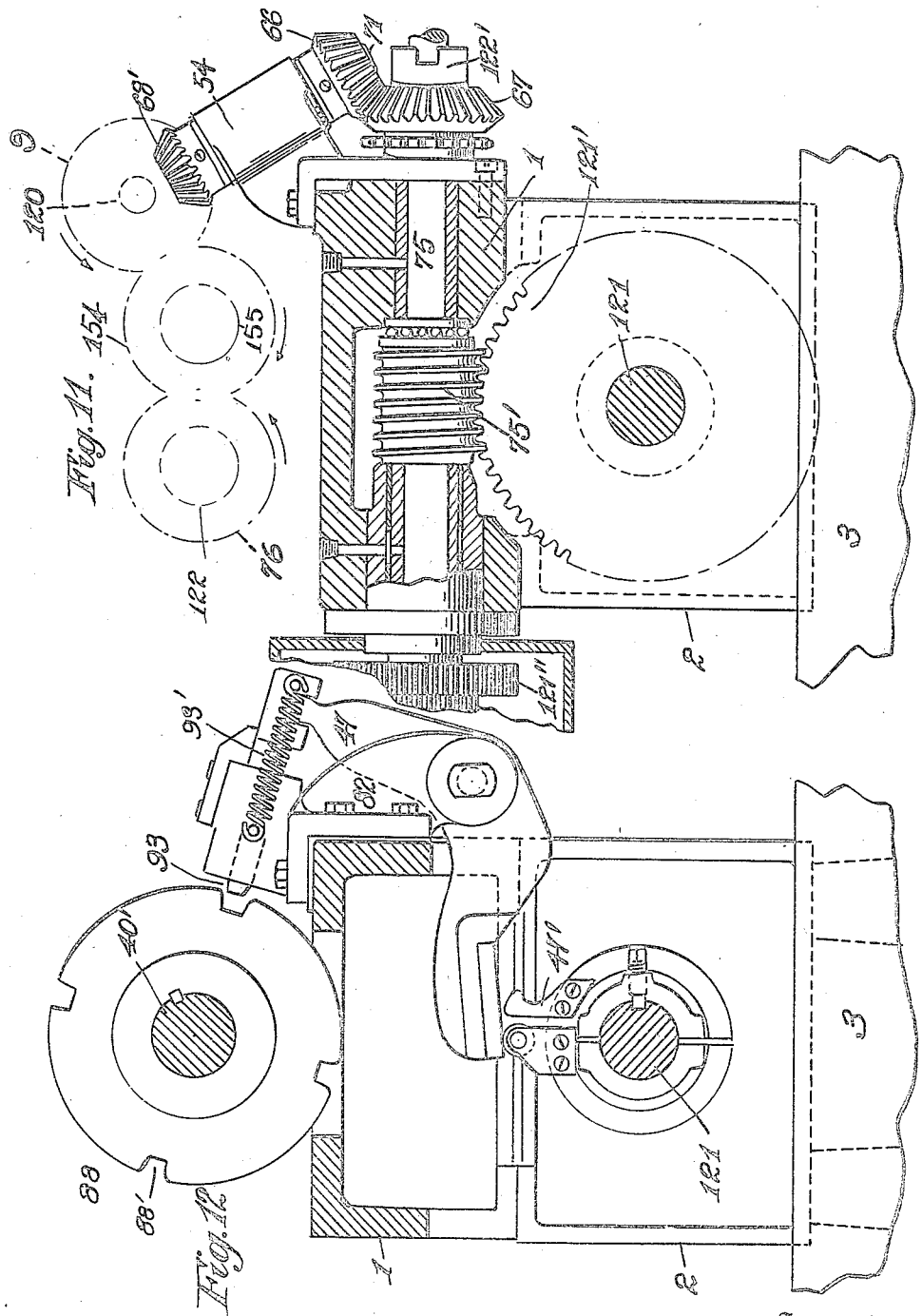
Inventor
Oscar A. Smith,
By his Attorneys

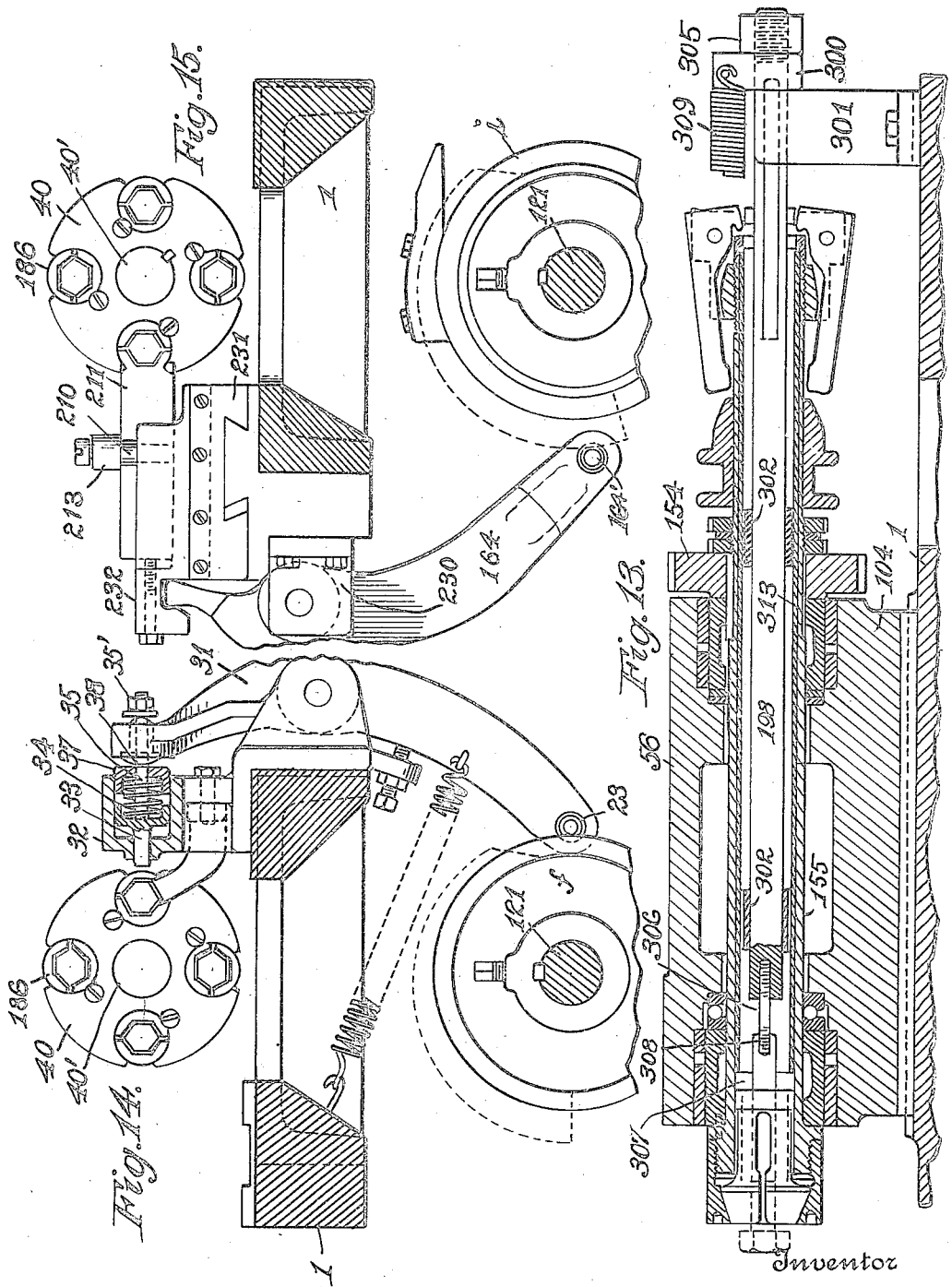

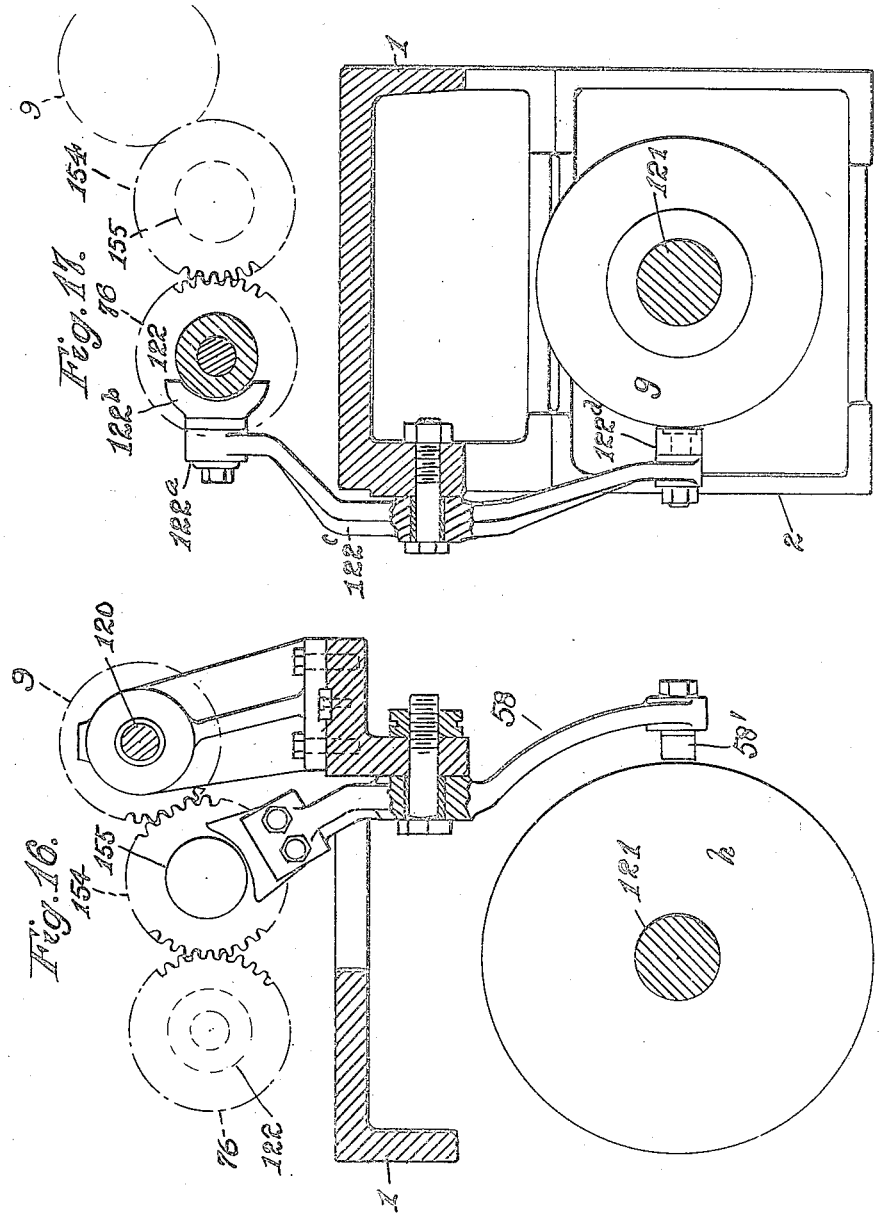

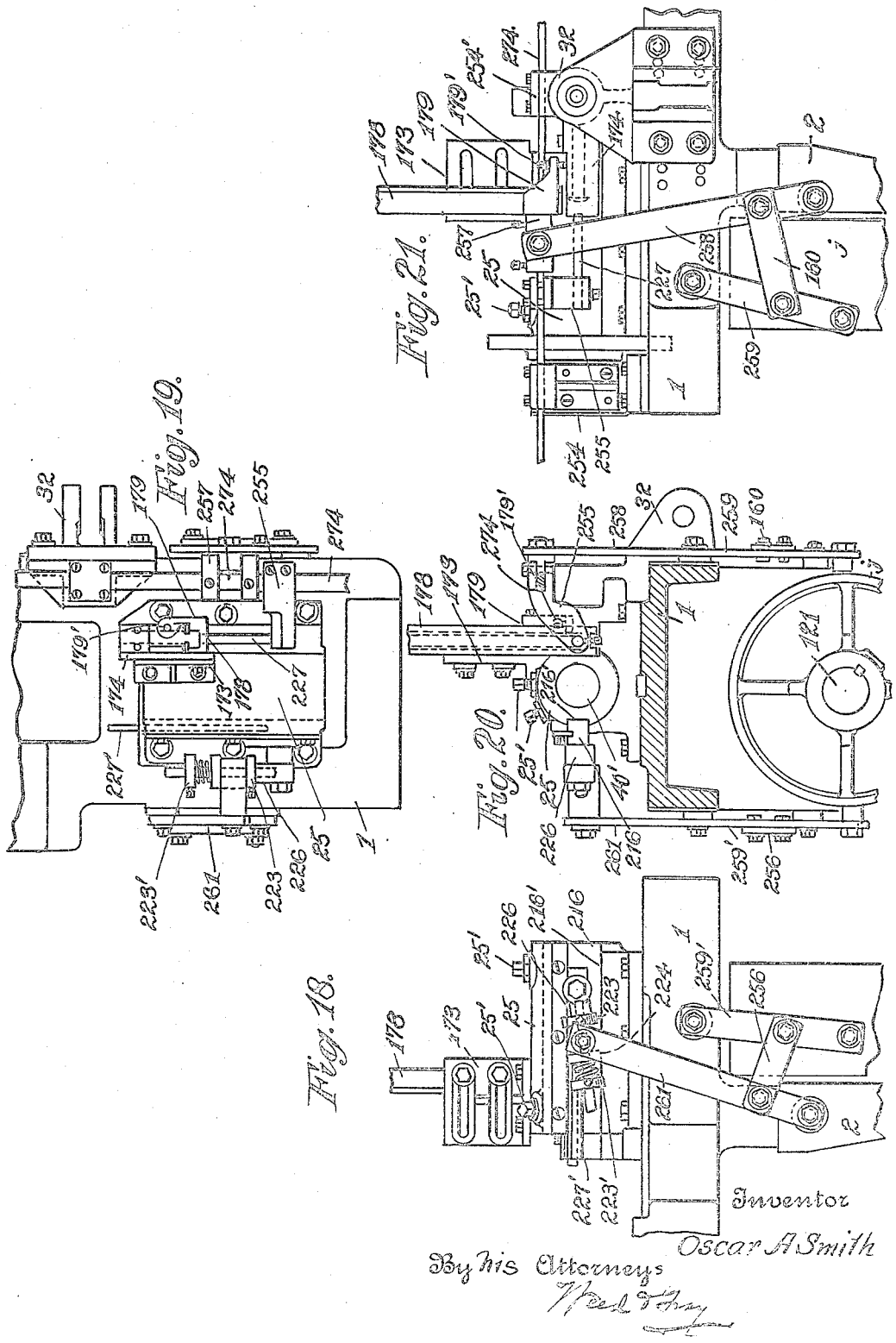

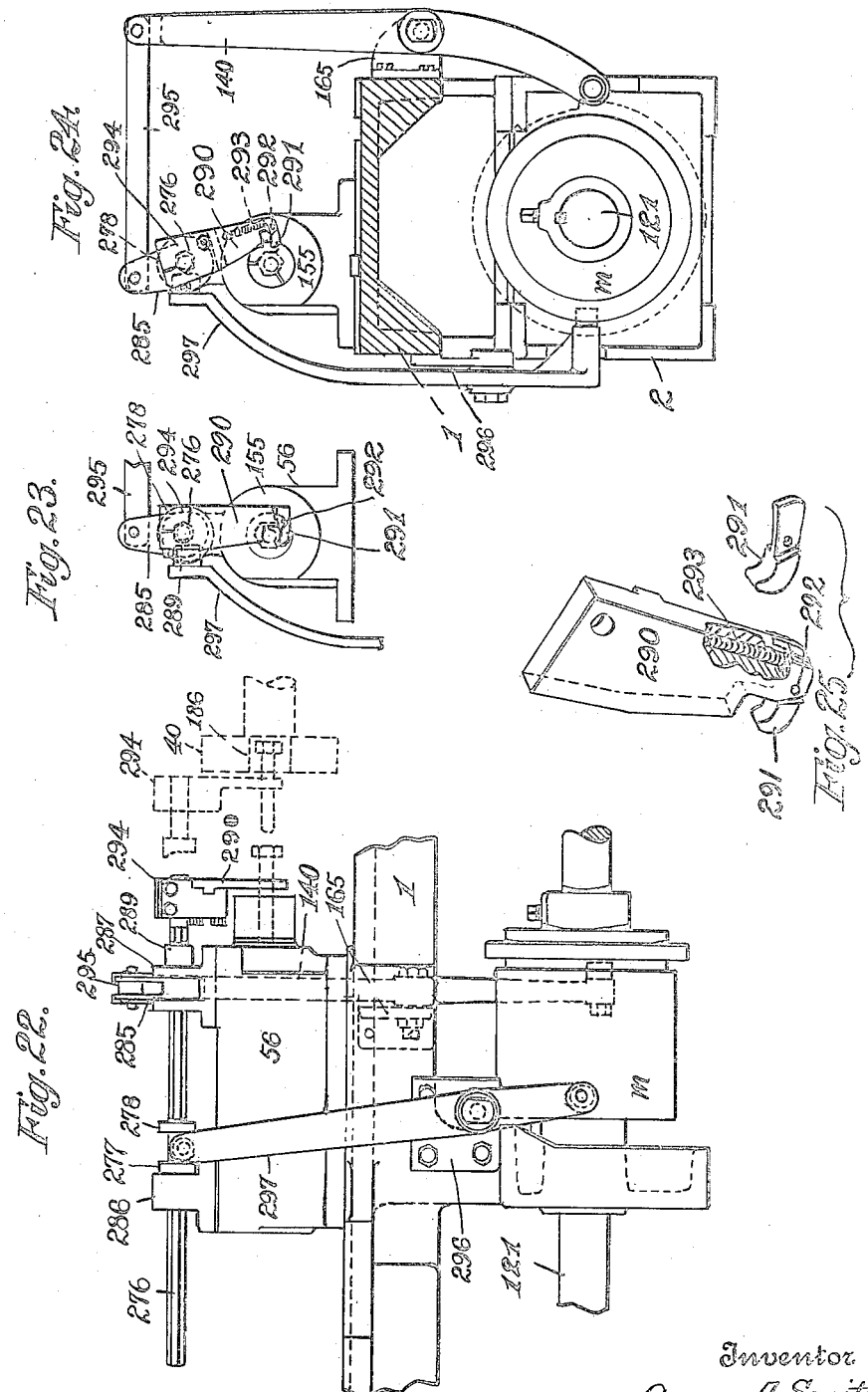

Patented Aug. 14, 1923.

1,464,957

UNITED STATES PATENT OFFICE.

OSCAR A. SMITH, OF CLEVELAND, OHIO, ASSIGNOR TO THE NATIONAL ACME COMPANY, OF CLEVELAND, OHIO, A CORPORATION OF OHIO.

POINTING AND SHAVING MACHINE FOR BOLTS, ETC.

Application filed August 10, 1921. Serial No. 491,064.

*To all whom it may concern:*

Be it known that I, OSCAR A. SMITH, a citizen of the United States, residing at Cleveland, in the county of Cuyahoga and State of Ohio, have invented certain new and useful Improvements in Pointing and Shaving Machines for Bolts, Etc., of which the following is a specification.

This invention relates to metal working machines, the object thereof being to provide a single automatically operative machine for forming the point, facing under, and shaving the top of the heads of bolts or cap screws and similar articles. This machine is especially adapted for bolts or cap screws made by what is known as the upset process, which form of bolts requires that they be pointed and faced under and shaved on top of the head after they leave the upsetting or heading machines.

Heretofore it has been necessary to form the point of the bolt or screw in a machine, especially adapted for this operation, then place the bolt or screw in another machine and face under and shave the top of the head, or at times the bolts have been handled first in a machine that points and faces under the head and then the bolts have been placed in another machine that shaves the head. According to either mode of procedure however, it has been necessary to rehandle the bolts and to use separate and distinct machines for performing these several operations.

In the present improved machine however, the bolts or screws are completely finished, without any rehandling, in a single machine being pointed, and faced under and shaved on top of the head when they leave the machine, so that the present machine does in one operation that which has heretofore required two distinct and separate machines to do and moreover, does it at the speed and efficiency of either of the machines heretofore required in performing a single operation. In fact, it has been found that to make 500,000 cap screws a day in the National Acme Company plant on the separate machines heretofore required, requires 170 machines, but the same number of cap screws can be made upon 85 of the present machines.

In other words, each of the present machines will do the work of two machines heretofore used, and performs this work at the same speed and efficiency as either of the old style machines took to perform their single operation, and this without the rehandling of the bolts or screws from the time they are placed in the magazine to be fed to the pointing tool until they are forced from the chuck completely pointed, finished, and shaped.

Thus, the present machine permits a great saving in time, labor, and production, and obviates the necessity of handling the bolts or screws or other articles worked upon as well as decreases the amount of floor space necessary in the shop, which has heretofore been required to accommodate the excessive number of machines used in order to do the same amount of work that is done on the present machine, and obviously decreases the amount of labor and handling of the machines heretofore required to look after such excessive number of machines.

In the drawings accompanying and forming a part of this specification, Fig. 1 is a perspective side view of the present machine this view illustrating what may be designated as the shaving side of the machine that is, that side where the operations of finishing and shaving the head of the bolt or screw are performed; Fig. 2 is a perspective side view of the opposite side of the machine and which may be designated as the pointing side of the machine, that is, that side of the machine where the pointing of the bolt or screw is performed; Fig. 3 is an enlarged view of the pointing side of the machine shown in Fig. 2, more clearly illustrating the pointing spindle mechanism and gripping mechanism; Fig. 4 is an enlarged view likewise of the pointing side of the machine, more clearly illustrating however, certain of the mechanisms at the right hand end of the machine shown in Fig. 2; Fig. 5 is also an enlarged view of the pointing side of the machine, illustrating certain mechanisms at the left hand end of the machine shown in Fig. 2; Fig. 6 is an enlarged view of the shaving side of the machine, illustrating in part certain of the mechanisms shown at the right hand end of Fig. 1; Fig. 7 is likewise an enlarged view of the shaving side of the machine illustrating certain mechanism shown at the left hand end of Fig. 1; Figs. 8, 9 and 10 are enlarged views of the shaving side of the machine illustrating more clearly certain of the mechanisms located between the two ends of the machine illustrated by Figs. 6 and 7.

In short, Figs. 1, 6, 7, 8, 9, and 10 are views taken from the shaving side of the machine while Figs. 2, 3, 4, and 5 are views taken from the pointing side of the machine.

Fig. 11 is a cross sectional view of the machine taken on line 11—11 Fig. 1, and illustrating a part of the worm shaft mechanism in section; Fig. 12 is a cross sectional view of the machine taken on line 12—12 Fig. 1, and illustrating the lock bolt mechanism; Fig. 13 is a longitudinal sectional view of the shaving spindle or chuck mechanism for holding the work during the shaving or forming thereof by the forming tool,—this view also illustrating the ejecting mechanism for the completed piece of work; Fig. 14 is a cross sectional view of the machine taken on line 14—14 Fig. 2, and partly illustrating in section the gripping mechanism for holding the work in the indexing turret or disk during the pointing thereof; Fig. 15 is a cross sectional view of the machine taken on line 15—15 Fig. 1, and illustrating the shaving or forming tool and its slides for operating upon the work while held in the chuck spindle shown in Fig. 13; Fig. 16 is a cross sectional view of the machine taken on line 16—16 Fig. 1, partly illustrating in section the shifting lever for operating the wedge mechanism of the chuck spindle shown in Fig. 13; Fig. 17 is a cross sectional view taken on line 17—17 Fig. 2, illustrating the lever for shifting the pointing spindle; Figs. 18, 19, 20, and 21 illustrate different views of the blank feeding mechanism for feeding a blank to the indexing turret or disk for operation thereon by the pointing spindle; Figs. 22, 23, 24, and 25 illustrate different views of the four-motion blank carrier head and its mechanism for carrying a pointed blank from the indexing disk or turret to the shaving chuck or spindle, the dotted lines in Fig. 22 illustrating one position of the four-motion blank carrier, to wit: that position where it clamps a blank after it has been carried by the indexing disk from the pointing spindle side to the shaving spindle side, the full lines in Fig. 22 illustrating the carrying of the blank into the shaving spindle chuck.

Similar characters of reference indicate corresponding parts in the different views.

In a general way, the present machine comprises a main driving shaft mechanism, a cam shaft mechanism operated from the main driving shaft mechanism by means of a worm shaft mechanism, a pointing spindle mechanism for pointing the bolts or screws likewise rotated from the main driving shaft mechanism,—and which pointing spindle mechanism is shifted by suitable means toward and from the work by the cam mechanism,—a rotary blank holding chuck or spindle likewise rotated from the main driving mechanism and opened and closed from the cam mechanism, and including ejecting means for ejecting a completed blank from the chuck, a forming, shaving, or finishing tool mechanism operated from the cam shaft mechanism, a rotary disk or turret indexed or intermittently operated from the cam shaft mechanism, and cooperating therewith, a locking bolt mechanism operated from the cam shaft mechanism for successively locking the indexing disk at its several stations, and a blank gripping mechanism for gripping the blanks while in the indexing disk to permit the operation thereon by the tool of the pointing spindle, and which gripping mechanism is likewise operated from the cam shaft mechanism, a suitable magazine and blank feeding means for feeding the blanks successively to the rotary indexing means, which blank feeding means is operated from the cam shaft mechanism, a blank carrier for taking the blanks from the indexing disk after it has been pointed and rotated or indexed to a position opposite the chuck spindle, together with blank feeding means cooperating with the blank carrier, which blank carrier and blank feeding means are operated from the cam shaft mechanism and are effective to deliver the previously pointed blank to the chuck spindle in readiness to be operated upon by the transversely operated forming shaving or finishing tool.

This blank carrier in the present machine is illustrated as a four-motion blank carrier, that is to say, it moves toward the indexing disk and then swings into position to grip the blank, then moves toward the chuck spindle to which the blank is delivered, and then swings away therefrom into its original position in readiness to grip the next blank.

Briefly, the several combined mechanisms cooperate to point the bolt or screw and shave and finish the head thereof and they do this by first delivering a blank from the magazine to the indexing disk whereupon the pointing spindle tool performs its operation, during which time of course the indexing disk is locked against movement and the blank therein is gripped so that the pointing tool can properly operate. When the pointing tool has finished its operation the indexing disk is unlocked and the blank is ungripped. Thereupon the disk is rotated to its next station and another blank fed into a preceding station, and the same operation is performed. Thereupon the first blank is indexed to a position opposite the shaving spindle chuck, where it is clamped by the four-motion carrier and together with the cooperating blank feeding means is carried into the chuck, whereupon the forming and finishing tools are moved into position to perform their operations upon the head, subsequent to which the blank is ejected from the chuck.

From the foregoing it will be seen that the indexing disk carries four blanks at a time, so that when a work blank is fed into the indexing disk on the pointing side of the machine and operated upon by the pointing tool, it is then carried over to the shaving side of the machine and transformed to the chuck spindle and then operated upon by the forming and finishing tools, and that thereafter every index of the indexing disk completes a finished blank, that is to say, it will be shaved on the point, shaved on top of the head and shaved under the head. The blanks, when they come to this machine, are in the form for instance, of a hexagon cap screw made by the upset process. The hexagon portion is finished, the top of the head requires shaving, the point requires pointing and the underside of the head requires finishing, and all of these operations take place and a complete blank is turned out at each index of the index disk after it is once loaded.

In addition to the foregoing mechanisms, it may be said that suitable means is also provided for adjusting the index disk toward or from the pointing spindle as occasion may require, according to the length of the piece that is to be operated upon.

*The indexing mechanism.*

In the preferred form thereof herein shown, the details of which obviously may be readily changed, this machine comprises a suitable bed 1, bolted to legs or standards 2, mounted in a suitable pan 3. On the top side at one end of the bed centrally located thereof there is bolted a work carrying or indexing disk bearing 25 (see for instance Fig. 1). At the extreme end of the bed directly in the rear of this bearing 25, and in line with the same is bolted an upwardly extending bearing 39 (see for instance Fig. 6). These bearings 25 and 39 are provided with suitable bores, into which is housed the shaft 40' of the indexing disk 40. Mounted upon the indexing disk shaft 40' between these bearings 25 and 39 is a spacing disk 88 having the same number of notches or recesses 88' as the indexing disk has gripping blocks hereinafter described. Fastened to the indexing disk shaft 40' against the outer face of bearing 39 is indexing gear 79 having, in this instance, four spaced segments of teeth. Bolted to the top of the bearing 39 and extending rearwardly and downwardly in alinement with the rearward end of the indexing shaft 40' is a supporting bracket 119. A sleeve 44 having a bore suitable to receive an end of the indexing disk shaft 40' is housed between the inner face of the bracket 119 and the outer face of the indexing gear 79. The indexing disk 40 has four bores circularly alined and equally spaced. Into these four bores are housed suitable gripping blocks or bushings, a pair 186 being housed in each bore. When this indexing disk is in its operating position two pairs of gripping blocks are in vertical alinement and two pairs in horizontal alinement with each other. The machine is provided with a cam shaft 121 rotated below the bed and on one outer end of this cam shaft is a quadrant or fan gear 78, which intermittently engages with the indexing gear 79, and thus indexes the indexing disk intermittently. For adjusting the indexing disk toward and from the pointing spindle tool, there is provided at the outer side of the bracket 119 in connection with an inserted button (not shown) in the end of the indexing disk shaft 40' and adjusting screw 24, and nut 24'. By loosening suitable set screws 24" (see Figs. 5 and 6) in the sleeve 44, and adjusting the screw 24 in the end of the bracket 119, the indexing disk can be moved forward or rearward as occasion requires according to the length of the piece that is to be operated upon. For the purpose of imparting suitable tension to the revolving indexing shaft 40' suitable tension screws 25' are located in the top of the bearing 25.

*The main driving shaft mechanism.*

The main driving shaft 120 for rotating the pointing spindle tool and chuck spindle, hereinafter described, and for imparting power to the cam shaft 121, hereinbefore referred to, is located at the opposite side of the machine (see, for instance, Figs. 4 and 7), and is carried by a pair of bearings, one as 7 mounted on the top of the bed directly in back of the chuck spindle bearing 56 hereinafter referred to, and the other bearing 5, is fastened to the end of the bed with its bore in line with the bore of the bearing 7, and in the bores of these two bearings is located the drive shaft 120, and on one end of this shaft, resting against the inner face of the bearing 5, is mounted a drive pulley 12. At the opposite end of this shaft, and resting against the outer face of bearing 7, is a spur gear 9, which, by the means hereinafter described, rotates the pointing tool spindle and the chuck spindle.

*The worm and cam shaft mechanism.*

Bolted to the top and side of the bed, midway between the bearings 5 and 7, is a worm shaft bearing bracket 54 (see Figs. 7 and 11). This bracket is provided with a bearing having a suitable angular bore, wherein is housed worm gear drive shaft 71.

Mounted on the upper end of this shaft 71 is a miter gear 68', which is in mesh with a suitable mating miter gear 68 mounted on the main driving shaft 120 and resting against the inner face of bearing 5 (see Fig. 7). To the lower end of shaft 71 is secured miter gear 66, which meshes with a similar miter gear 67 mounted on the end of worm shaft 75, which is housed in a suitable bore extending transversely of the bed of the machine, and therefore at right angles to the main driving shaft 120. A suitable distance below the worm shaft 75, carrying the worm 75' and at right angles to the same is housed the cam shaft 121 hereinbefore referred to, carrying a worm wheel 121'. Suitable change gear mechanism 121" is located at one end of the worm shaft 75 and suitable clutch mechanism 122' is located at the opposite end of this worm shaft, being controlled by suitable hand lever 122" (see Fig. 1). This worm shaft mechanism including the clutch mechanism, change gears, and worm wheel, is substantially the same as that commonly used in the standard equipment of National Acme machines, and has been so repeatedly illustrated and described in one form or another in various patents of the National Acme Company, that it seems unnecessary to describe the same more in detail, especially since one such mechanism is shown and described in the contemporaneously pending application of Smith and Leber, Serial No. 441,545 filed February 1, 1921. The purpose of this worm shaft mechanism is to transmit power from the main driving shaft 120 to the cam shaft 121 at the desired speed according to the change gears used, and the clutch mechanism referred to is merely for the purpose of enabling the operator to stop the operation of the cam shaft at any desired time.

*The lock bolt mechanism.*

The lock bolt mechanism for locking the indexing disk 40 in its several stations is secured to a bracket bearing 82 bolted on the shaving side of the bed at the extreme end thereof opposite the driving shaft (see Figs. 6 and 12). The upper end of this bracket bearing 82 has an angular bore into which is housed the lock bolt 93. Pivoted to a lower extended portion of the bearing 82 is a lock bolt lever 47, which in conjunction with suitable cams and dogs 47' mounted on the cam shaft 121,—and a description of which is deemed unnecessary herein since this is likewise a well known form of mechanism in National Acme machines and is illustrated and described in various of its patents,—operates the lock bolt 93 so as to suitably engage at the proper time the several notches or recesses 88' in the spacing disk 88 hereinbefore referred to, suitable springs 93' being used to maintain the lever 47 in engagement with the cams 47' carried on a cam disk or drum of the cam shaft 121.

*The blank gripping mechanism.*

The lock bolt mechanism locks the indexing disk against movement during the idle periods thereof, and at this time and when the pointing tool is operating upon the blanks to point the same, it is necessary to also grip the work blanks to hold the same against movement. For this purpose suitable gripping means is used, and this gripping means is carried at the pointing side of the machine. Bolted to the bed at the pointing side of the machine is an extended bearing 32 having a suitable bore at right angles to and in horizontal alinement with the horizontally positioned gripping blocks (see Figs. 2, 3, 5 and 14 for instance, the last of which figures shows the details of this gripping mechanism). Into the bore of this bearing 32 is housed a gripping plunger 33, the outer end of which is bored to receive a coiled spring 34. The inner end of this gripping plunger is reduced in diameter to fit the reduced portion of the bore in bracket bearing 32. Into the extreme outer end of this bearing 32 is fitted a cup-shaped plunger 37. Into this cup-shaped plunger 37 is housed the other end of the coiled spring 34. The lower portion of the bracket 32 has an outwardly extending crotch bearing, into which is rearwardly hung a lever 31. In the upper end of this lever 31 is a contact button 38, which is in alinement with the plunger 37.

The parts 33 and 37 and button 38 have a central bore through which loosely passes a regulating rod 35, which is suitably fastened to the bottom of the plunger 33, and with the aid of the nut 35' at the outer end of this rod, the plunger 33, the spring 34, plunger 37 and lever 31 are maintained in their assembled relation.

To the lower end of the lever 31 is suitably fastened a stud and roller 23, which comes in contact with a suitable cam on the cam disk *f* of the cam shaft 121 at the proper time, thereby to operate the gripping means and grip the gripping blocks on to a blank in the indexing disk.

*The pointing tool spindle mechanism.*

The pointing tool spindle is carried on the pointing side of the machine, and for this purpose there is provided a suitable distance away from the face of the indexing disk 40 two bearings 85 and 104, secured to the bed of the machine (see, for instance, Figs. 3 and 4). These bearings have a suitable bore into which is housed a pointing spindle 122 for carrying a suitable pointing tool. The bore of the pointing spindle is in horizontal alinement with the bore of one of the horizontally positioned gripping blocks of the indexing disk 40 when the disk is in idle position. By a suitable grooved collar 122$^a$, with which cooperates a yoke-shaped block 122$^b$ carried by a lever 122$^c$ pivotally bolted to the side of the machine, the pointing spindle is shifted toward and from the work in its bearings 85 and 104, by suitable cams carried on a cam disk or drum $g$ of the same shaft 121, and which cams cooperate with the stud-carried roller 122$^d$ secured to the lower end of the lever 122$^c$ (see for instances, Figs. 3, 4 and 17). At the opposite side of the machine to the pointing side, and therefore on the shaving side of the machine, and in line with the other horizontally positioned gripping block when the indexing disk is in an idle position, and at a suitable distance away from the face of the indexing disk 40 is located the shaving spindle or chuck spindle, and for this purpose there is bolted to the bed a bearing 56, in which is housed this shaving spindle 155 (see, for instance, Figs. 8, 9, 10, and 13, the last of which particularly shows the details of this chuck spindle). For rotating the pointing tool spindle and the shaving spindle, suitable gearing is provided, (see, for instance, Figs. 3 and 4). As hereinbefore stated, the main driving shaft 120 carries the spur gear 9, which meshes with the spur gear 154 secured to the shaving spindle 155, and rests against the rear face of the bearing 56 carrying the said spindle, and this rotates the shaving spindle.

In mesh with this spur gear 154 and resting against the face of bearing 104 is a spur gear 76 mounted on the pointing spindle 122. Thus, through the medium of the driving pulley 12 and the main driving shaft 120 and spur gear 9, the shaving spindle is rotated through its spur gear 154 and the pointing spindle 122 is rotated through its spur gear 76.

*The shaving chuck spindle and ejector mechanism.*

The shaving chuck spindle in construction and operation is substantially the same as in the well known National Acme automatic screw machines, wherein this type of spindle is used, and therefore a detailed description thereof is not deemed necessary. It is sufficient to say that the operating lever 58 (see, for instance, Fig. 16 and Fig. 13) pivotally bolted to the shaving side of the bed, and likewise suitably operated from the cam shaft 121 through the medium of suitable cams carried by a cam drum $h$ for engaging a stud roller 58' and located at the lower end of the lever 58, opens and closes the chuck at the proper time to receive the previously pointed blank. Between the end of the push tube 313 (see Fig. 13) and the inner end of the chuck, is a collar 307 having a threaded bore. Into this collar is housed an adjusting screw 308. Into the inner end of this adjusting screw is pressed in a suitable bore a stud 306, the outer end of which stud is suitably threaded, on to which is screwed the inner end of a plunger rod 198.

Pinned to this rod 198 are a pair of bearings 302, a suitable distance apart. This rod 198 protrudes out from the rear end of the spindle a suitable distance and has slabbed portions parallel with each other. To the bed is bolted a bracket 301 located a suitable distance away from the rear end of the chuck spindle, and which bracket has a groove machined in its upper portion, into which the slabbed portion of the rod 198 is housed. A collar 300 is fastened to this rod, and rests against the rear face of the bracket 301. Directly in back of this collar 300 and screwed to the rod 198 is an adjusting collar 305 held in proper position by a suitable set screw (not shown). A coiled spring 309 is fastened by a suitable pin to collar 300 and bearing bracket 104, whereupon at the proper time when the chuck releases the finished work, which is caused by the receding movement of certain parts thereof, the finished piece of work is removed from the chuck by the ejecting rod 198, since the chuck mechanism moves backward relatively thereto in order to open the chuck.

*Mechanism for operating on the head of the bolt or screw.*

For operating upon the head, when the blank is located in the chuck of the chuck spindle, suitable generally designated forming mechanism is provided, carried at the shaving side of the machine (see, for instance, Figs. 8, 9, 10, and 15, in the last of which the details of this mechanism are more clearly shown). Dovetailed to the top of the bed, a suitable distance away and at right angles to the shaving spindle 155, is a slide rest 231. The top side of this slide rest 231 has a dovetailed portion at right angles to the chuck spindle, and in this dovetailed portion is housed a shaving slide 232. Into the top face of this shaving slide is machined a suitable groove, into which is clamped by suitable posts 210 and strap 213 a shaving tool holder 211 adapted to carry a circular shaving tool of a pattern commonly used on standard National Acme automatic screw machines and frequently designated as "circular forming tools." Directly below and in line with slide 231 and bolted to the side of the bed is a crotched bracket 230 and into this crotch is pivotally hung a lever 164. The outwardly extending portion of slide 232 is formed or recessed on its underside to receive the upper end of this lever 164, and to the lower end of this lever 164 is secured a stud roller 164' in position to contact at suitable times with a properly formed cam carried by a cam disk $i$ mounted on the cam shaft 121, and by which means the forming or shaving tool is shifted toward and from the bolt or screw, the head of which is to be properly shaved and finished.

Magazine mechanism.

A suitable magazine is provided for supporting the blanks to be fed into the indexing means, disk, or carrier in line with the end working tool hereinbefore designated, as the pointing spindle tool. Bolted to the top and at the inner end of the indexing disk bearing 25 is a magazine supporting bracket 173. Bolted to this bracket 173 and resting against the face of bearing 25 is a magazine 178 (see any of Figs. 1, 6, 8, and 9). The supporting bracket 173 is provided with a plurality of horizontal slots thereby to permit a rearward and forward adjustment of the magazine thereon, it being secured to this slotted bracket by suitable bolts. Directly below the magazine and bolted to the side of the bearing 25 (see, for instance, Fig. 21) is a receiving block 174 having a bore suitably machined to receive the work blanks successively from the magazine. Bolted to the magazine above this block is a receiving block adjusting bracket 179 having an adjusting screw 179'. The receiving block 174 receives the blanks successively from the lower end of the magazine, and in position to be operated upon by the primary blank feeding mechanism about to be described.

Primary blank feeding mechanism.

To the upper side of the bearing 39 (see, for instance, Figs. 3 and 5), which bearing it will be remembered is between the notched disk 88 and the indexing gear 79, and on the pointing side of the machine, is bolted a feed rod bearing 254. At the extreme top of the bearing bracket 32 on the same side of the machine, which latter bearing it will be remembered carries the blank gripping mechanism, is another feed rod bearing 254'. These two bearings have rectangular bores in line with each other, in which is housed a main feed slide bar 274.

Fastened by suitable means to the feed slide bar 274 is an auxiliary feed dog 255. The inner lower end of this dog has a suitable bore, into which is housed a feed rod 227. This rod is in line with the machined upper portion or bore of the receiving block 174 hereinbefore referred to as connected with the magazine, and which block it will be remembered receives the blanks successively from the magazine which are pushed by the feed rod 227 into the indexing disk or carrier hereinbefore described. For operating this feed rod mechanism, a lever 258 is provided, the lower end of which is pivoted to one of the legs of the bed and the upper end of this lever 258 is provided with a stud roller in position to rest against the side of the feed slide bar 274.

On each side of this stud roller and fastened to the feed slide bar 274 is an adjustable dog 257, by means of which obviously when the lever 258 is swung or operated, the slide bar is shifted or reciprocated in its bearings 254 and 254' and by means of the dog 255 shifts the feed bar 227 thereby to push a blank from the receiving block 174 into the indexing means, disk, or carrier. Pivotally connected to the side of the bed a suitable distance above the lower pivoted end of the lever 258 and at a suitable distance away from the same is a lever 259. To the inside face at the lower end of this lever 259 is likewise fastened a suitable stud roller. A suitable distance above the lower pivotal point of the lever 258 and below the upper pivotal point of lever 259 these two levers are connected by a link lever 260. Secured to the cam shaft 121 is a suitable cam disk or drum $j$ carrying the proper formation of cams to engage the stud roller of the lever 259 and thereby shift the lever 258, the slide bar 274 and the feed rod 227 to, as hereinbefore stated, feed the blanks successively to the indexing means or carrier. This feeding mechanism has been herein designated as the primary blank feeding mechanism for the reason that there is a somewhat similar feeding mechanism which assists in feeding the partially completed blanks, that is, the blanks which have their ends pointed, from the indexing means or carrier or disk to what has been designated as the shaving chuck spindle, since it is the spindle that is provided with an openable and closable chuck for receiving the pointed blank and holding it in position to be operated upon by the head forming tools usually comprising the shaving and finishing tools.

Secondary blank feeding or pushing mechanism.

On the shaving side of the machine and horizontally machined in the bearing 25 that carries the indexing disk shaft (see, for instance, any of Figs. 1, 6, 8, and 9) is a tongued slideway 216', in which is housed a feed slide block 216. The end of this slide block 216 has a bore, which is in line with the bore of one of the horizontally positioned gripping blocks in the indexing disk 40 opposite to the shaving chuck spindle. Into the bore of this slide block is fastened a suitable feed rod 227' for reciprocating movement with the slide block 216. Pivotally hung to the side of this slide block 216 is a buffer link 226. This secondary blank feeding mechanism is operated by a similar means to that just described for operating the main blank feeding means on the opposite or pointing side of the machine, to wit: the levers 258, 259, and 260; and therefore a lever 261 has its lower end pivoted to a leg of the bed and is provided at its upper end with a stud fastened to its inner face, which stud rests against the side of the buffer link 226, and is crotched or bifurcated to receive the buffer link 226. On opposite sides of this stud are collars 223 and 224. Collar 223 is tightly fastened to the buffer link while collar 224 has a coiled spring in front of it mounted on the buffer link.

Secured to the buffer link by a set screw just ahead of this spring is a collar 223'. Thus the collar 224 and spring, which is held in position by the adjustable collar 223', acts as a buffer to take up the shock of the lever 261. Pivotally secured to the side of the bed a suitable distance above the lower pivotal point of the lever 261 and at a suitable distance away from the same is a pivoted lever 259'. To the inside face of the lower end of this lever 259' is secured a stud roller in position to cooperate with suitable properly formed cams on a cam drum $k$ carried by the cam shaft 121. Intermediate their ends at the proper place, the levers 259' and 261 are pivotally connected by a lever link 256.

The secondary feed rod or pusher mechanism is operative to push the partially completed blank, that is, the previously pointed blank from the gripper blocks 186 into the chuck of the shaving chuck spindle 155 when the same has been carried into position by the carrier mechanism about to be described. In other words, it assists the carrier to perform this work.

*The swinging or reciprocating or four motion blank carrier mechanism.*

This carrier is reciprocated into position to clamp or grip a pointed blank when the blank has been carried by the indexing disk into position in line with the shaving chuck spindle and carry the blank from the indexing disk to the shaving chuck spindle and for that purpose it is reciprocated toward the indexing means, then swung into position to grasp the blank, then reciprocated toward the chuck spindle, and then swung therefrom to its original position. Suitably fastened to the top inner end of the shaving chuck spindle bearing 56 is a crotched bearing bracket 287 (see, for instance, Figs. 2, 4, 8, 9, and 10). This bracket has a suitable bore at right angles to the crotch of the bracket, and therefore is in parallelism with the bore of the shaving chuck bracket 56. To the opposite end of this bracket 56 is bolted another upright bearing 286 having a bore in line with the bore of the bracket 287. Into the bore of the front bearing bracket 287 is housed a sleeve 289 having a hexagon bore.

A rod 276 has a cylindrical portion thereof housed in the rear bearing bracket 286 and a hexagon portion housed in the sleeve 289 of the bracket 287. To the end of this rod, which extends beyond the bracket 287 and toward the indexing disk 40 is fastened the carrier or carrier head 294. Pivotally supported upon a bracket 296, which is bolted to the side of the bed is a traverse operating lever 297. To the upper end of this lever is fastened a suitable stud roller and between the brackets 286 and 287 carrying the rod 276 are located two adjustable collars 277 and 278 adapted to be engaged by the stud roller of the lever 297, since the inner face of the stud roller rests against the side of the rod 276 and is flanked on either side by the collars 277 and 278. To the lower inner face of this carrier head operating lever 297 is fastened a stud roller, which comes in contact with suitable cams on a cam drum $m$ carried by the cam shaft 121. Mounted on the periphery of the hexagon bushing 289 is an operating slotted link lever 285, the slot being located at right angles to the rod 276.

Bolted to the bed on the opposite or pointing side of the machine is a bearing bracket 165 in substantial alinement with the slot in the link lever 285. Carried by this bracket 165 is a pivotally hung lever 140, the upper end of which is crotched.

A connecting link 295 connects lever 140 with link lever 285 by suitable pivot pins. To the lower inner face of carrier head 294 (see, for instance, Figs. 22, 23, 24, and 25) is fastened by a suitable tongue and screws a trigger plate 290. The lower end of the trigger plate is machined to conform to the diameter of the bolt or screw to be carried. A trigger 291 is pivotally hung by means of a pin 292 to the extreme lower end of the trigger plate, and in conjunction with coiled spring 293 acts as a gripping means for holding the work blank while carrying it into position. From the foregoing it will thus be seen that by means of the operating lever 297 and sliding rod 276 the carrier head 294 is carried toward the indexing disk 40, and from thence toward the chuck of the shaving chuck spindle and by means of this same sliding rod 276 which is also a rocking rod or shaft, and the lever 140, the carrier head is rocked or swung toward and from the blank in the indexing disk, which is in alinement with the shaving chuck spindle and also toward and from the shaving chuck spindle.

In other words, the mechanism is so timed that at the proper time and after the bolt or screw has been properly pointed and carried by the indexing disk in position in alinement with the shaving chuck, the carrier head will be shifted or reciprocated toward the indexing disk and then swung into position to grasp a blank and carry it from the indexing disk into position opposite the chuck of the shaving chuck spindle, for which purpose the carrier head is then moved from the indexing disk toward the chuck and when the blank has been received by the chuck the carrier head is then swung away from the chuck.

In other words, it recedes to its original position in readiness to go through the foregoing motions at the proper time. Cooperating with the carrier head during its movement from the indexing disk to the chuck is a secondary feed rod or pushing mechanism hereinbefore described, the push rod of which it will be remembered is designated as 227′.

*The operation.*

To recapitulate briefly, the indexing disk has been adjusted laterally by the adjusting means hereinbefore described to suit the length of the screw and the four stations in the indexing disk having been supplied with the suitable gripping blocks conforming to the size of the blank to be gripped, which therefore are changeable according to the diameter of blanks to be gripped; the indexing disk it will be assumed is at rest. A bolt or screw is then fed from the magazine into one pair of gripping blocks a suitable distance by means of a primary feeding mechanism on the pointing side of the machine and the gripping mechanism on the pointing side of the machine is operated to hold the blank in place while at the same time of course the indexing disk is locked by its locking bolt against movement. During the gripping of the blank by the gripping means, the pointing tool travels forward and of course is being rotated, thereby to point the blank. The gripping mechanism and the primary feeding mechanism then recede. Then through the indexing fan gear and its cooperating means the indexing turret, it first being unlocked is rotated one step or one-quarter of its diameter toward the shaving side of the machine. This brings another station in position to receive another work blank.

When the turret indexes another station, the first blank, that is, the one that has been pointed, is then in alinement with the shaving spindle chuck 155. At this time the carrier head 294 is carried toward the face of the index or turret by means of the lever 297 in conjunction with the rod 276, the proper setting of which is obtained by the adjustable collars 277 and 278. Then by means of the lever 140, link 295, link 285 and bushing 289, the carrier head is swung toward the work blank in the indexing disk whereupon the trigger 291 grasps the work blank intermediate its ends. Then the secondary feeding or pushing mechanism on the shaving side in conjunction with the carrier operating lever 297 through the proper operation of the cams and cam drums on the cam shaft 121, carries the carrier head with its work blank toward the chuck spindle and into the chuck a suitable distance, whereupon the carrier head is swung away from the chuck and the work blank, while the secondary feeding or pushing mechanism having carried the work blank forward into the chuck a suitable distance is withdrawn, whereupon the chuck is operated to grasp the work blank in readiness to have the head operated upon. Thereupon the forming and shaving tool slide travels toward the work blank and suitable tools provided for the purpose, shave the top and under side of the head of the work blank and thus finish it.

When the operations upon the head are completed the ejecting mechanism hereinbefore described carried by the chuck spindle is operated as the chuck opens to release the blank and ejects the same from the chuck.

Thus it will be observed that in this machine both ends of a blank are worked upon without any intermediate handling of the blank.

It will also be observed that the carrier head 294 is a very important and essential feature of this machine, and operates to carry a blank from the indexing disk to the chuck of the chuck shaving spindle directly opposite thereto, and for this purpose it is a reciprocating as well as a swinging carrier head, and in fact is a four-motion carrier head, since it moves toward the indexing turret, recedes therefrom, and also swings toward the blank and is swung away therefrom.

Furthermore, it will be observed from the foregoing that applicant has made it possible to provide a construction in which the pointing tool carried by tool spindle 122 and the shaving and facing tools carried by slide 232 operate at the same end of the indexing turret or holding means 40 for working upon both ends of the headed blank. Not only are the pointing spindle 122 and rotary chuck spindle 155 located at opposite sides of the machine in substantial parallel relation, but they operate at opposite sides of the turret or holding means 40, and have the axes thereof within the area of turret 40. It will also be noted that a pair of tools are provided which operate at the same end of the blank holder 40, and at opposite sides for both pointing and shaving the blanks. Intermediate the two operations of pointing and shaving the position of the blank is shifted which is not only accomplished when the blank carrier 40 is indexed but also when the blank is fed from the blank carrier into the rotary chuck spindle 155.

As the present machine is one of the most important of the National Acme line of machines, it follows that the various details thereof may be more or less modified or changed without departing from the spirit or scope of the improvement as defined in the claims, and that while the details of the various cams and other detailed parts are not particularly defined, it will be understood that these cams and their co-related parts are so formed and positioned and timed that the machine will properly operate to perform the work in the manner described herein, which is obvious from the fact that machines of this kind are now in operation and from which operating machines the photographs, forwarded on the filing of this application and hereby made a part hereof, were made.

I claim as my invention:

1. In a metal working machine, the combination of means for holding a headed blank, means for pointing one end of the blank, and means for facing under and also finishing the top of the head of the blank without the rehandling thereof, both of said means operating at the same end of said holding means.

2. In a metal working machine, the combination of means for holding a headed blank, means for automatically feeding such blanks successively to said holding means, means for pointing a blank while in said holding means, means for shifting the position of said blank, and means for facing under and also finishing the top of the head of the blank.

3. In a metal working machine, the combination of means for holding a headed blank, means for automatically feeding such blanks successively to said holding means, means for pointing a blank while in said holding means, means for shaving the head of the blank, and means for ejecting the blank, both said pointing and shaving means operating at the same end of the holding means.

4. In a metal working machine, the combination of a pair of means for successively holding a headed blank, means for pointing one end of the blank while in one of said holding means, and means for facing under and finishing the top of the head of the blank while in the other of said holding means.

5. In a metal working machine the combination of a pair of means for successively holding a headed blank, means for pointing one end of the blank while in one of said holding means, means for facing under and finishing the top of the head of the blank while in the other of said holding means, and means for transferring said blank from one to the other of said holding means intermediate the operations of pointing and working upon the head of the blank.

6. In a metal working machine, the combination of a pair of means for successively holding a headed blank, means for pointing one end of the blank while in one of said holding means, means for facing under and finishing the top of the head of the blank while in the other of said holding means, and means for transferring said blank from one to the other of said holding means intermediate the operations of pointing and working upon the head of the blank, the head working means being operative in a direction transverse to that of the pointing means.

7. In a metal working machine, the combination of a pair of means for holding a blank, means for feeding a blank to one of said means, means for transferring the blank from said holding means to the other, means for working upon one end of the blank while in one of said holding means, and means for working upon the opposite end of the blank while in the other of said holding means.

8. In a metal working machine the combination of a pair of means for holding a blank, means for transferring the blank from one of said holding means to the other, means for working upon one end of the blank while in one of said holding means, and means for working upon the opposite end of the blank while in the other of said holding means, one of said working means comprising a side working tool.

9. In a metal working machine, the combination of a pair of oppositely disposed means for successively carrying a blank, means for feeding blanks to one of said means, means for working upon said blank while in said carrying means, and means for transferring said blank from said carrying means to the other.

10. In a metal working machine, the combination of a pair of oppositely disposed means for successively carrying a blank, one of said means being intermittently rotatable, and the other of said means being continuously rotatable, means for working upon said blank while in each of said carrying means, and means for transferring said blank from one of said carrying means to the other.

11. In a metal working machine, the combination of a pair of means for successively carrying a blank, one intermittently rotatable and the other continuously rotatable, means for transferring the blank from one of said means to the other of said means, means for working upon one end of said blank while in one of said carrying means, and means for working upon the opposite end of said blank while in the other of said carrying means.

12. In a metal working machine, the combination of a pair of means for successively carrying a blank, one intermittently rotatable and the other continuously rotatable, means for transferring the blank from the intermittently rotatable means to the continuously rotatable means, means for working upon one end of the blank while in the intermittently rotatable means, and means for working upon the opposite end of the blank while in the continuously rotatable means.

13. In a metal working machine, the combination of blank holding and indexing means, means for automatically feeding a headed blank thereto, means for locking said indexing means, means for gripping the blanks while in said indexing means, means for pointing the blanks while in said indexing means, a second rotary holding means facing said indexing means, means for transferring the blanks from said indexing means to said second holding means, and means for facing under and finishing the head of the blanks while in said second holding means.

14. In a metal working machine, the combination of blank holding and indexing means, means for automatically feeding a headed blank thereto, means for locking said indexing means, means for gripping the blanks while in said indexing means, means for pointing the blanks while in said indexing means, a second rotary holding means facing said indexing means, means for transferring the blanks from said indexing means to said second holding means, means for facing under and finishing the head of the blanks while in said second holding means, and means carried by said second holding means for ejecting the blanks.

15. In a metal working machine, the combination of a pair of rotatable means for successively holding a blank, said means facing each other and one of said means being intermittently rotatable, means for pointing the blank while in the intermittently rotatable means, means for transferring the blank to the other rotatable holding means, and means for working upon the head of the blank while in said last rotatable holding means.

16. In a metal working machine, the combination of a pair of rotatable means for successively holding a blank, said means facing each other and one said means being intermittently rotatable, means for pointing the blank while in the intermittently rotatable means, means for transferring the blank to the other rotatable holding means, and means for working upon the head of the blank while in said last rotatable holding means, said last working means comprising side working tools movable transversely to said pointing means.

17. In a metal working machine, the combination of a pair of rotatable spindles, one adapted to carry a tool and the other a blank, intermittently rotatable means for carrying a blank from a position opposite to the end of one spindle to a position opposite the end of the other spindles, means for transferring the blank from said intermittently rotatable means to said second spindle, and means for working upon said blank while in said second spindle.

18. In a metal working machine, the combination of a pair of rotatable spindles, one adapted to carry a tool and the other a blank, intermittently rotatable means for carrying a blank from a position opposite to the end of one spindle to a position opposite the end of the other spindle, means for transferring the blank from said intermittently rotatable means to said second spindle, and means for working upon said blank while in said second spindle, said last means comprising a side working tool.

19. In a metal working machine, the combination of a pair of rotatable spindles, one adapted to carry a tool and the other a blank, intermittently rotatable means for carrying a blank from a position opposite to the end of one spindle to a position opposite the end of the other spindle, said spindles having the axes thereof within the area of said intermittently rotatable means, means for transferring the blank from said intermittently rotatable means to said second spindle, and means for working upon said blank while in said second spindle.

20. In a metal working machine, the combination of a pair of rotatable spindles, one adapted to carry a pointing tool, means for reciprocating said pointing tool spindle, the other spindle adapted to receive a blank, said spindles being located in parallel relation and on opposite sides of the machine, an intermittently rotatable carrier for carrying a blank from a position opposite the pointing tool to a position opposite the receiving spindle, means for transferring the blank from said carrier to said receiving spindle, and means for working upon the head of said blank while in said receiving spindle.

21. In a metal working machine, the combination of a pair of rotatable spindles, one adapted to carry a pointing tool, means for reciprocating said pointing tool spindle, the other spindle adapted to receive a blank, said spindles being located in parallel relation and on opposite sides of the machine, an intermittently rotatable carrier for carrying a blank from a position opposite the pointing tool to a position opposite the receiving spindle, means for transferring the blank from said carrier to said receiving spindle, means for working upon the head of said blank while in said receiving spindle, means for locking the carrier at each successive indexing thereof, and means for gripping the blank when opposite the pointing tool.

22. In a metal working machine, the combination of a pair of rotatable spindles, one adapted to carry a pointing tool, means for reciprocating said pointing tool spindle, the other spindle adapted to receive a blank, said spindles being located in parallel relation and on opposite sides of the machine, an intermittently rotatable carrier for carrying a blank from a position opposite the pointing tool to a position opposite the receiving spindle, means for transferring the blank from said carrier to said receiving spindle, means for working upon the head of said blank while in said receiving spindle, means for locking the carrier at each successive indexing thereof, means for gripping the blank when opposite the pointing tool, and means for automatically feeding a blank to the carrier at each successive indexing thereof.

23. In a metal working machine, the combination of a pair of rotatable spindles, one adapted to carry a pointing tool, means for reciprocating said pointing tool spindle, the other spindle adapted to receive a blank, said spindles being located in parallel relation and on opposite sides of the machine, an intermittently rotatable carrier for carrying a blank from a position opposite the pointing tool to a position opposite the receiving spindle, means for transferring the blank from said carrier to said receiving spindle, means for working upon the head of the blank while in said receiving spindle, means for locking the carrier at each successive indexing thereof, means for gripping the blank when opposite the pointing tool, means for automatically feeding a blank to the carrier at each successive indexing thereof, and means for ejecting a blank from the receiving spindle.

24. In a metal working machine the combination of rotatable blank holding means, a pair of means at the same end of said holding means for operating upon opposite ends of the blank, and a second holding means adapted to hold the blank during the operation of one of said operating means.

25. In a metal working machine the combination of means for working upon one end of a piece of work, means for subsequently receiving the partially completed piece of work, means for carrying the work from a position in line with one of said means to a position in line with the other of said means, means for transferring the work from said carrying means to said receiving means, and means for operating upon the opposite end of the work, said first means and said last means being located at the same side of said carrying means.

26. In a metal working machine, the combination of means for working upon one end of a piece of work, means for subsequently receiving the partially completed piece of work, means for carrying the work from a position in line with one of said means to a position in line with the other of said means, means for transferring the work from said carrying means to said receiving means, and means for operating upon the opposite end of the work, said transferring means comprising a swinging and reciprocating carrier.

27. In a metal working machine the combination of rotatable blank holding means, a pair of means at the same end of said holding means for operating upon opposite ends of the blank, and a second holding means adapted to hold the blank during the operation of one of said operating means, one of said holding means having the axis thereof within the area of the other holding means.

28. In a metal working machine, the combination of means for working upon one end of a piece of work, continuously rotatable work holding means for subsequently receiving the partially completed piece of work, rotary means for intermittently indexing the work from a position in line with one of said means to a position in line with the other of said means, means for transferring the work from said carrying means to said work holding means, and means for operating upon the opposite end of the work.

29. In a metal working machine, the combination of means for pointing one end of a piece of work, means for subsequently receiving the partially completed piece of work, means for carrying the work from a position in line with one of said means to a position in line with the other of said means, means for transferring the work from said carrying means to said receiving means, and means for operating upon the head of the work.

30. In a metal working machine, the combination of a pointing spindle means, a blank receiving chuck spindle means, means for rotating said spindles, means for reciprocating said pointing spindle means, a blank indexing means adapted to carry a blank from a position opposite the pointing spindle, means to a position opposite the chuck spindle means, and a blank carrier mechanism for carrying a blank from the indexing means to the chuck spindle.

31. In a metal working machine, the combination of a pointing spindle means, a blank receiving chuck spindle means, means for rotating said spindles, means for reciprocating said pointing spindle means, a blank indexing means adapted to carry a blank from a position opposite the pointing spindle means to a position opposite the chuck spindle means, and a reciprocating blank carrier mechanism for carrying a blank from the indexing means to the chuck spindle.

32. In a metal working machine the combination of intermittently rotatable means for holding a headed blank, means at one end of said holding means for operating on one end of the blank, means for rotating the holding means, and means at the same end of the holding means for operating on the opposite end of the blank.

33. In a metal working machine, the combination of means for holding a blank, means for working upon one end of the blank while in said holding means, an independent means for holding said blank, means for gripping the blank intermediate its ends and for transferring the blank from said first holding means to said second holding means, and means for working upon the opposite end of the blank while in said second holding means.

34. In a metal working machine the combination of means for holding a blank, means for locking said holding means against movement, means for gripping the blank therein, means for working upon one end of the blank while in said holding means, an independent means for holding said blank, means for gripping the blank intermediate its ends and for transferring the blank from said first holding means to said second holding means, and means for working upon the opposite end of the blank while in said second holding means.

35. In a metal working machine, the combination of means for holding a blank, means for working upon one end of the blank while in said holding means, means for indexing said holding means to carry the blank into a different position, an independent means for holding said blank, means for gripping the blank intermediate its ends and for transferring the blank from said first holding means to said second holding means, and means for working upon the opposite end of the blank while in said second holding means.

36. In a metal working machine, the combination of means for holding a blank, means for feeding blanks thereto, means for working upon the blank while in said holding means, means for indexing said holding means to carry the blank into a different position, an independent means for holding said blank, means for transferring the blank from said first holding means to said second holding means, and means for working upon the blank while in said second holding means.

37. In a metal working machine, the combination of a blank holding means, means for feeding blanks thereto, means for intermittently rotating it, means for operating upon the blank while in said means, a second blank holding means, means for gripping the blank between the ends and for transferring the blank from the first holding means to said second holding means, and means for operating upon the other end of the blank while in said second holding means.

38. In a metal working machine, the combination of a blank indexing holding means, means for intermittently rotating it, means for operating upon one end of the blank while in said indexing means, a second rotary blank holder located opposite to said indexing means, means for operating upon the other end of the blank while in said second holding means, and means for transferring the blank from the first holding means to the second holding means and comprising a reciprocating and swinging carrier.

39. In a metal working machine, the combination of means for pointing one end of a headed blank, means for facing and finishing the head of said blank, intermittently indexed means for carrying the blank from the pointing means to the head working means, and means for adjusting one of said means relatively to the length of blank to be operated upon.

40. In a metal working machine, the combination of means for pointing one end of a headed blank, means for facing and finishing the head of said blank, intermittently indexed means for carrying the blank from the pointing means to the head working means, and means for adjusting the indexing means relatively to the length of blank to be operated upon.

41. In a metal working machine, the combination of a pair of rotary opposed spindles located on opposite sides of the machine, means for rotating the spindles, one of said spindles adapted to carry a pointing tool and the other a blank receiving chuck, means for reciprocating the pointing tool spindle, an intermittently rotatable blank carrier for carrying the blanks from a position opposite the pointing tool spindle to a position opposite the receiving chuck spindle, means for adjusting said blank carrier according to the length of blank to be operated upon, means for transferring a blank from said carrier to said chuck, and means for facing and finishing the head of the blank while in said chuck.

42. In a metal working machine, the combination of an intermittently rotated indexing means, means for indexing it, means for adjusting the indexing means according to the length of work to be operated upon, means for locking the indexing means in its indexed position, primary feeding means for feeding a blank to the indexing means, means for successively gripping the blanks in the indexing means, a pointing tool spindle, means for rotating it, and means for shifting it toward and from the indexing means, a chuck spindle for receiving the blank from the indexing means, a blank carrier for transferring a blank from the indexing means to the chuck spindle, a secondary feeding means for assisting the feed of the blank from the indexing means and carrier means to the chuck spindle, means for operating upon the head of the blank while in the chuck spindle, and means for ejecting a blank from the chuck spindle.

43. In a metal working machine, the combination of an intermittently rotated indexing means, means for indexing it, means for adjusting the indexing means according to the length of work to be operated upon, means for locking the indexing means in its indexed position, primary feeding means for feeding a blank to the indexing means, means for successively gripping the blanks in the indexing means, a pointing tool spindle, means for rotating it, and means for shifting it toward and from the indexing means, a chuck spindle for receiving the blank from the indexing means, a blank carrier for transferring a blank from the indexing means to the chuck spindle, a secondary feeding means for assisting the feed of the blank from the indexing means and carrier means to the chuck spindle, means for operating upon the head of the blank while in the chuck spindle, and means for ejecting a blank from the chuck spindle, said ejecting means being carried by the chuck spindle.

44. In a metal working machine, the combination of an intermittently rotated indexing means, means for indexing it, means for adjusting the indexing means according to the length of work to be operated upon, means for locking the indexing means in its indexed position, primary feeding means for feeding a blank to the indexing means, means for successively gripping the blanks in the indexing means, a pointing tool spindle, means for rotating it, and means for shifting it toward and from the indexing means, a chuck spindle for receiving the blank from the indexing means, a four-motion blank carrier for transferring a blank from the indexing means to the chuck spindle, a secondary feeding means for assisting the feed of the blank from the indexing means and carrier means to the chuck spindle, means for operating upon the head of the blank while in the chuck spindle, and means for ejecting a blank from the chuck spindle.

45. In a metal working machine, the combination of a pair of opposed blank holding means, means for feeding blanks to one holding means, means for carrying a blank from said holding means to the other holding means, and means for operating on a blank in said holding means.

46. In a metal working machine, the combination of a pair of opposed blank holding means, means for gripping a blank intermediate its ends and for carrying the same from one of said holding means to the other of said holding means, and means cooperating with said blank carrying means for feeding the blank into said last holding means.

47. In a metal working machine, the combination of a pair of opposed blank holding means, means for carrying a blank from one of said holding means to the other holding means, and means for operating on a blank in each holding means, said carrying means comprising a four-motion carrier.

48. In a metal working machine, the combination of a pair of opposed blank holding means, means for feeding blanks to one holding means, means for carrying a blank from said holding means to the other holding means, and means for operating on a blank in each holding means, said blank carrying means comprising a reciprocating blank carrier.

49. In a metal working machine, the combination of a pair of opposed blank holding means, means for carrying a blank from one of said holding means to the other holding means, and means for operating on a blank in each holding means, said blank carrying means comprising a reciprocating and swinging blank carrier, cam operated mechanism for reciprocating said blank carrier, and cam operated mechanism for swinging said blank carrier.

50. In a metal working machine, the combination of a pair of opposed blank holding means, means for operating on a blank in each holding means, and means for carrying a blank from one of said holding means to the other holding means, said blank carrying means comprising a carrier having a blank grasping means.

51. In a metal working machine, the combination of a pair of opposed blank holding means, and means for carrying a blank from one of said holding means to the other holding means, said blank carrying means comprising a carrier having a blank grasping means having a pivoted trigger.

52. In a metal working machine, the combination of a pair of opposed blank holding means, and means for carrying a blank from one of said holding means to the other holding means and comprising a blank carrier having a spring controlled pivoted trigger.

53. In a metal working machine, the combination of a pair of opposed blank holding means, and means for carrying a blank from one of said holding means to the other holding means, and comprising a blank carrier having a spring controlled pivoted trigger, a sliding and rocking rod upon which the carrier is mounted, a cam operated lever for reciprocating said rod, and a cam operated lever for swinging said rod.

54. The combination of a cam shaft, a rotatable blank holding means controlled from said cam shaft, means for feeding a blank to said blank holding means, means for operating upon the blank in said holding means, a main drive shaft, worm shaft mechanism for driving said cam shaft, and an inclined shaft and cooperating gears for driving the worm shaft from said main drive shaft.

55. In a metal working machine, the combination of a primary blank feeding means, blank holding means for receiving a blank from said primary blank feeding means, a second blank holding means, means for shifting the first blank holding means relatively to the second blank holding means, and secondary blank feeding means for feeding a blank from the first blank holding means to the second blank holding means, and means for working upon the blanks while in each of said blank holding means.

56. In a metal working machine, the combination of a primary blank feeding means, blank holding means for receiving a blank from said primary blank feeding means, a second blank holding means, and secondary blank feeding means for feeding a blank from the first blank holding means to the second blank holding means, and means for working upon the blanks while in each of said blank holding means, said two blank feeding means being located on opposite sides of the machine.

57. In a metal working machine, the combination of a primary blank feeding means, blank holding means for receiving a blank from said primary blank feeding means, a second blank holding means, and secondary blank feeding means for feeding a blank from the first blank holding means to the second blank holding means, and means for working upon the blanks while in each of said blank holding means, each of said blank feeding means including a sliding bar.

58. In a metal working machine, the combination of a primary blank feeding means, blank holding means for receiving a blank from said primary blank feeding means, a second blank holding means, and secondary blank feeding means for feeding a blank from the first blank holding means to the second blank holding means, means for working upon the blanks while in each of said blank holding means, each of said blank feeding means including a sliding bar, and means for operating each of said sliding bars and comprising a pair of cam operated, pivoted, link-connected levers.

59. In a metal working machine, the combination of a pair of rotary blank holding means, one intermittently rotated, means for feeding a blank into said intermittently rotated blank holding means, and means for feeding a blank from said intermittently rotated means to the other blank holding means.

60. In a metal working machine, the combination of a pair of rotary blank holding means, one intermittently rotated, means for feeding a blank into said intermittently rotated blank holding means, means for feeding a blank from said intermittently rotated means to said other blank holding means, and means for working upon the end of the blank while in the intermittently rotated blank holding means.

61. In a metal working machine, the combination of a pair of rotary blank holding means, one intermittently rotated, means for feeding a blank into said intermittently rotated blank holding means, means for feeding a blank from said intermittently rotated means to said other blank holding means, means for working upon the end of the blank while in the intermittently rotated blank holding means, and means for working upon the other end of the blank while in the other blank holding means.

62. In a metal working machine, the combination of a pair of rotary blank holding means, one intermittently rotated, means for feeding a blank into said intermittently rotated blank holding means, means for feeding a blank from said intermittently rotated means to said other blank holding means, means for working upon the end of the blank while in the intermittently rotated blank holding means, means for working upon the other end of the blank while in the other blank holding means, and means for carrying a blank from the intermittently rotated blank holding means to the other blank holding means.

63. In a metal working machine, the combination of a pair of rotary blank holding means, one intermittently rotated, means for feeding a blank into said intermittently rotated blank holding means, means for feeding a blank from said intermittently rotated means to the other blank holding means, means for working upon the end of the blank while in the intermittently rotated blank holding means, means for working upon the other end of the blank while in the other blank holding means, and means for carrying a blank from the intermittently rotated blank holding means to the other blank holding means and comprising a four-motion blank carrier.

64. In a metal working machine, the combination of a pair of blank holding means located opposed to each other, means for feeding a blank into one of said blank holding means, and means for feeding a blank into the other of said blank holding means, one of said blank feeding means working through one of said blank holding means.

65. In a metal working machine, the combination of a pair of rotary blank holding means, one intermittently rotated, means for feeding a blank into said intermittently rotated blank holding means, means for feeding a blank from said intermittently rotated means to said other blank holding means, means for working upon the end of the blank while in the intermittently rotated blank holding means, means for working upon the other end of the blank while in the other blank holding means, and means for carrying a blank from the intermittently rotated blank holding means to the other blank holding means, said pair of blank feeding means being located on opposite sides of the machine.

66. In a metal working machine, the combination of a pair of rotary blank holding means, one intermittently rotated, means for feeding a blank into said intermittently rotated blank holding means, means for feeding a blank from said intermittently rotated means to said other blank holding means, means for working upon the end of the blank while in the intermittently rotated blank holding means, means for working upon the other end of the blank while in the other blank holding means, means for carrying a blank from the intermittently rotated blank holding means to the other blank holding means, said pair of blank feeding means being located on opposite sides of the machine, and a four motion blank carrier cooperating with one of said blank feeding means.

67. In a metal working machine, the combination of a pair of rotary blank holding means, one intermittently rotated, means for feeding a blank into said intermittently rotated blank holding means, means for feeding a blank from said intermittently rotated means to said other blank holding means, means for working upon the end of the blank while in the intermittently rotated blank holding means, means for working upon the other end of the blank while in the other blank holding means, means for carrying a blank from the intermittently rotated blank holding means to the other blank holding means, and ejecting means carried within the last blank holding means for ejecting the completed blank.

68. In a metal working machine, the combination of a pair of blank holding means located opposed to each other, means for feeding a blank into one of said blank holding means, means for feeding a blank into the other of said blank holding means, one of said blank feeding means working through one of said blank holding means, and ejecting means working through the other of said blank holding means.

69. In a metal working machine, the combination of a pair of rotatable spindles, one adapted to carry a tool and the other a blank, intermittently rotatable means for carrying a blank from a position opposite to the end of one spindle to a position opposite the end of the other spindle, means for transferring the blank from said intermittently rotatable means to said second spindle, means for working upon said blank while in said second spindle, and means carried by said second spindle for ejecting a blank.

70. In a metal working machine, the combination of a pair of rotatable spindles, one adapted to carry a tool and the other a blank, intermittently rotatable means for carrying a blank from a position opposite to the end of one spindle to a position opposite the end of the other spindle, the axes of said spindles extending within the area of said means, means for transferring the blank from said intermittently rotatable means to said second spindle, means for working upon said blank while in said second spindle, and means carried by said second spindle for ejecting a blank, and comprising a rod located axially thereof.

71. In a metal working machine, the combination of a pair of rotary spindles located on opposite sides of the machine, one adapted to carry a pointing tool for pointing a headed blank, and the other a chuck, means for rotating both of said spindles and comprising a main driving shaft and a system of gearing connecting the spindles therewith, a cam shaft, worm shaft mechanism operative from said main driving shaft for rotating said cam shaft, means operated by said cam shaft for reciprocating the pointing spindle, an intermittently rotatable blank carrier for carrying the headed blanks, means carried by the cam shaft for intermittently indexing said carrier, a magazine for carrying headed blanks, primary means operative from said cam shaft for feeding the blanks from said magazine to said carrier, means operative from said cam shaft for locking the carrier at each indexing thereof, means operative from the cam shaft for gripping a blank in the carrier when opposite the pointing tool, a blank carrier for transferring a blank from said intermittently rotatable carrier to said chuck, means operative from the cam shaft for reciprocating said transferring blank carrier, means operative from the cam shaft for swinging said transferring blank carrier whereby it is operative in four directions, a secondary feeding means operative from the cam shaft for assisting the transferring blank carrier to transfer a blank from the intermittently rotated blank carrier to the chuck, and reciprocating means operative from the cam shaft for facing and shaving the head of the blank while carried by the chuck and operative in a direction transverse to the direction of movement of the pointing tool.

72. In a metal working machine, the combination of a pair of rotary spindles located on opposite sides of the machine, one adapted to carry a pointing tool for pointing a headed blank, and the other a chuck, means for rotating both of said spindles and comprising a main driving shaft and a system of gearing connecting the spindles therewith, a cam shaft, worm shaft mechanism operative from said main driving shaft for rotating said cam shaft, means operated by said cam shaft for reciprocating the pointing spindle, an intermittently rotatable blank carrier for carrying the headed blanks, means carried by the cam shaft for intermittently indexing said carrier, a magazine for carrying headed blanks, primary means operative from said cam shaft for feeding the blanks from said magazine to said carrier, means operative from said cam shaft for locking the carrier at each indexing thereof, means operative from the cam shaft for gripping a blank in the carrier when opposite the pointing tool, a blank carrier for transferring a blank from said intermittently rotatable carrier to said chuck, means operative from the cam shaft for reciprocating said transferring blank carrier, means operative from the cam shaft for swinging said transferring blank carrier whereby it is operative in four directions, a secondary feeding means operative from the cam shaft for assisting the transferring blank carrier to transfer a blank from the intermittently rotated blank carrier to the chuck, reciprocating means operative from the cam shaft for facing and shaving the head of the blank while carried by the chuck and operative in a direction transverse to the direction of movement of the pointing tool, and ejecting means carried by the chuck spindle for ejecting a finished blank therefrom.

73. In a metal working machine, the combination of a pair of rotary spindles located on opposite sides of the machine, one adapted to carry a pointing tool for pointing a headed blank, and the other a chuck, means for rotating both of said spindles and comprising a main driving shaft and a system of gearing connecting the spindles therewith, a cam shaft, worm shaft mechanism operative from said main driving shaft for rotating said cam shaft, means operated by said cam shaft for reciprocating the pointing spindle, an intermittently rotatable blank carrier for carrying the headed blanks, means carried by the cam shaft for intermittently indexing said carrier, a magazine for carrying headed blanks, primary means operative from said cam shaft for feeding the blanks from said magazine to said carrier, means operative from said cam shaft for locking the carrier at each indexing thereof, means operative from the cam shaft for gripping a blank in the carrier when opposite the pointing tool, a blank carrier for transferring a blank from said intermittently rotatable carrier to said chuck, means operative from the cam shaft for reciprocating said transferring blank carrier, means operative from the cam shaft for swinging said transferring blank carrier whereby it is operative in four directions, a secondary feeding means operative from the cam shaft for assisting the transferring blank carrier to transfer a blank from the intermittently rotated blank carrier to the chuck, and reciprocating means operative from the cam shaft for facing and shaving the head of the blank while carried by the chuck and operative in a direction transverse to the direction of movement of the pointing tool, said primary blank feeding and secondary blank feeding means including a pair of linked levers each pivotally connected at one end to a fixed part of the machine.

74. In a metal working machine, the combination of a pair of rotary spindles located on opposite sides of the machine, one adapted to carry a pointing tool for pointing a headed blank, and the other a chuck, means for rotating both of said spindles and comprising a main driving shaft and a system of gearing connecting the spindles therewith, a cam shaft, worm shaft mechanism operative from said main driving shaft for rotating said cam shaft, means operated by said cam shaft for reciprocating the pointing spindle, an intermittently rotatable blank carrier for carrying the headed blanks, means carried by the cam shaft for intermittently indexing said carrier, a magazine for carrying headed blanks, primary means operative from said cam shaft for feeding the blanks from said magazine to said carrier, means operative from said cam shaft for locking the carrier at each indexing thereof, means operative from the cam shaft for gripping a blank in the carrier when opposite the pointing tool, a blank carrier for transferring a blank from said intermittently rotatable carrier to said chuck, means operative from the cam shaft for reciprocating said transferring blank carrier, means operative from the cam shaft for swinging said transferring blank carrier whereby it is operative in four directions, a secondary feeding means operative from the cam shaft for assisting the transferring blank carrier to transfer a blank from the intermittently rotated blank carrier to the chuck, reciprocating means operative from the cam shaft for facing and shaving the head of the blank while carried by the chuck and operative in a direction transverse to the direction of movement of the pointing tool, ejecting means carried by the chuck spindle for ejecting a finished blank therefrom, and change gear mechanism carried by the worm shaft mechanism for changing the speed of the cam shaft.

75. In a metal working machine, the combination of a pair of rotary spindles located on opposite sides of the machine, one adapted to carry a pointing tool for pointing a headed blank, and the other a chuck, means for rotating both of said spindles and comprising a main driving shaft and a system of gearing connecting the spindles therewith, a cam shaft, worm shaft mechanism operative from said main driving shaft for rotating said cam shaft, means operated by said cam shaft for reciprocating the pointing spindle, an intermittently rotatable blank carrier for carrying the headed blanks, means carried by the cam shaft for intermittently indexing said carrier, a magazine for carrying headed blanks, primary means operative from said cam shaft for feeding the blanks from said magazine to said carrier, means operative from said cam shaft for locking the carrier at each indexing thereof, means operative from the cam shaft for gripping a blank in the carrier when opposite the pointing tool, a blank carrier for transferring a blank from said intermittently rotatable carrier to said chuck, means operative from the cam shaft for reciprocating said transferring blank carrier, means operative from the cam shaft for swinging said transferring blank carrier whereby it is operative in four directions, a secondary feeding means operative from the cam shaft for assisting the transferring blank carrier to transfer a blank from the intermittently rotated blank carrier to the chuck, reciprocating means operative from the cam shaft for facing and shaving the head of the blank while carried by the chuck and operative in a direction transverse to the direction of movement of the pointing tool, and means for adjusting the indexing carrier according to the length of the blank to be operated upon.

76. In a metal working machine, the combination of a pair of rotary spindles located on opposite sides of the machine, one adapted to carry a pointing tool for pointing a headed blank, and the other a chuck, means for rotating both of said spindles and comprising a main driving shaft and a system of gearing connecting the spindles therewith, a cam shaft, worm shaft mechanism operative from said main driving shaft for rotating said cam shaft, means operated by said cam shaft for reciprocating the pointing spindle, an intermittently rotatable blank carrier for carrying the headed blanks, means carried by the cam shaft for intermittently indexing said carrier, a magazine for carrying headed blanks, primary means operative from said cam shaft for feeding the blanks from said magazine to said carrier, means operative from said cam shaft for locking the carrier at each indexing thereof, means operative from the cam shaft for gripping a blank in the carrier when opposite the pointing tool, a blank carrier for transferring a blank from said intermittently rotated carrier to said chuck, means operative from the cam shaft for reciprocating said transferring blank carrier, means operative from the cam shaft for swinging said transferring blank carrier whereby it is operative in four directions, a secondary feeding means operative from the cam shaft for assisting the transferring blank carrier to transfer a blank from the intermittently rotated blank carrier to the chuck, reciprocating means operative from the cam shaft for facing and shaving the head of the blank while carried by the chuck and operative in a direction transverse to the direction of movement of the pointing tool, ejecting means carried by the chuck spindle for ejecting a finished blank therefrom, change gear mechanism carried by the worm shaft mechanism for changing the speed of the cam shaft, and means for adjusting the indexing carrier according to the length of blank to be operated upon.

77. In a metal working machine, the combination of a pair of blank holding means, a four-motion blank carrier for carrying a blank from one holding means to the other, means for operating said carrier, and means for rotating one of said holding means.

78. In a metal working machine, the combination of a pair of blank holding means, a reciprocating and swinging blank carrier for carrying a blank from one holding means to the other, means for operating said carrier, and means for rotating one or both of said holding means.

79. In a metal working machine, the combination of a pair of blank holding means, a blank carrier for gripping a blank intermediate its ends and for carrying the same from one holding means to the other, means for operating said carrier, and means for rotating one of said holding means.

80. In a metal working machine, the combination of a pair of blank working tools, a pair of carriers including a four motion blank carrier for carrying a blank from one tool to the other, and means for operating said carrier.

81. In a metal working machine, the combination of a pair of blank working tools, a reciprocating blank carrier for gripping a blank intermediate its ends and for carrying the same into operating position with relation to one of said tools, and means for operating said carrier.

82. In a metal working machine, the combination of a pair of blank working tools, blank carrier mechanism for carrying a blank from one tool to the other, said mechanism having means for gripping a blank intermediate its ends, and means for operating said carrier.

83. In a metal working machine, the combination of a pair of blank holding means, a blank carrier for carrying a blank from one holding means to the other, and means for operating said carrier, said carrier having a shiftable trigger.

84. In a metal working machine, the combination of a pair of blank working tools, blank carrier mechanism for carrying a blank from one tool to the other, and means for operating said carrier, said carrier mechanism including a shiftable trigger.

85. In a metal working machine the combination of means for holding a blank, means at one end of said holding means for operating on one end of the blank, means for shifting the position of the blank, and means at the same end of the holding means for operating upon the opposite end of the blank.

86. In a metal working machine the combination of means for holding a headed blank, and tool mechanism mounted at the same end of said holding means for pointing and shaving the blank.

87. In a metal working machine the combination of rotatable means for holding a headed blank, and a pair of tools operating at opposite sides of said holding means for working on opposite ends of the blank.

Signed at Cleveland, Ohio.

OSCAR A. SMITH.